United States Patent
Ogawa et al.

(10) Patent No.: US 7,140,739 B2
(45) Date of Patent: Nov. 28, 2006

(54) LIGHT SOURCE DEVICE AND PROJECTOR

(75) Inventors: Yasunori Ogawa, Suwa (JP); Shinsuke Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/759,172

(22) Filed: Jan. 20, 2004

(65) Prior Publication Data

US 2004/0239897 A1   Dec. 2, 2004

(30) Foreign Application Priority Data

Mar. 11, 2003 (JP) .............................. 2003-065357

(51) Int. Cl.
G03B 21/14 (2006.01)
G03B 21/22 (2006.01)
F21V 7/00 (2006.01)
F21V 5/00 (2006.01)

(52) U.S. Cl. .................. 353/119; 353/122; 362/310; 362/350; 362/365; 362/368; 362/375

(58) Field of Classification Search ............... 353/119, 353/122; 362/257, 267, 310, 362, 365, 368, 362/374, 375, 296, 341, 347, 350
See application file for complete search history.

(56) References Cited

U.S. PATENT DOCUMENTS 5,455,655 A * 10/1995 Hicks .......................... 355/67
6,300,717 B1   10/2001 Ooms ........................... 315/56
2002/0080612 A1 * 6/2002 Ozawa et al. ............... 362/268
2002/0141188 A1 * 10/2002 Basey ......................... 362/294
2003/0165064 A1 * 9/2003 Yang ........................... 362/516

FOREIGN PATENT DOCUMENTS

| JP | U-02-111187 | 9/1990 |
| JP | U-03-098436 | 10/1991 |
| JP | A 8-304739 | 11/1996 |
| JP | A-11-345515 | 12/1999 |
| JP | A-2002-350977 | 12/2002 |

* cited by examiner

Primary Examiner—W. B. Perkey
Assistant Examiner—Rochelle Blackman
(74) Attorney, Agent, or Firm—Oliff & Berridge, PLC

(57) ABSTRACT

A light source device (411) has a lamp body (411A) including a light source lamp, a reflector (417) and an anti-explosion glass (418), and a lamp housing (411B) for accommodating the lamp body (411A). A plurality of projections (411B8) protruding along an optical axis of a light beam irradiated by the light source lamp are formed on the lamp housing (411B). Further, the reflector (417) has an approximately concave cross section and a positioning surface (417C) that touches the projections (411B8) of the lamp housing (411B) to locate the lamp body (411A) relative to the lamp housing (411B) is provided on a distal side of the concave section. The positioning surface (417C) is continuously flush.

14 Claims, 18 Drawing Sheets

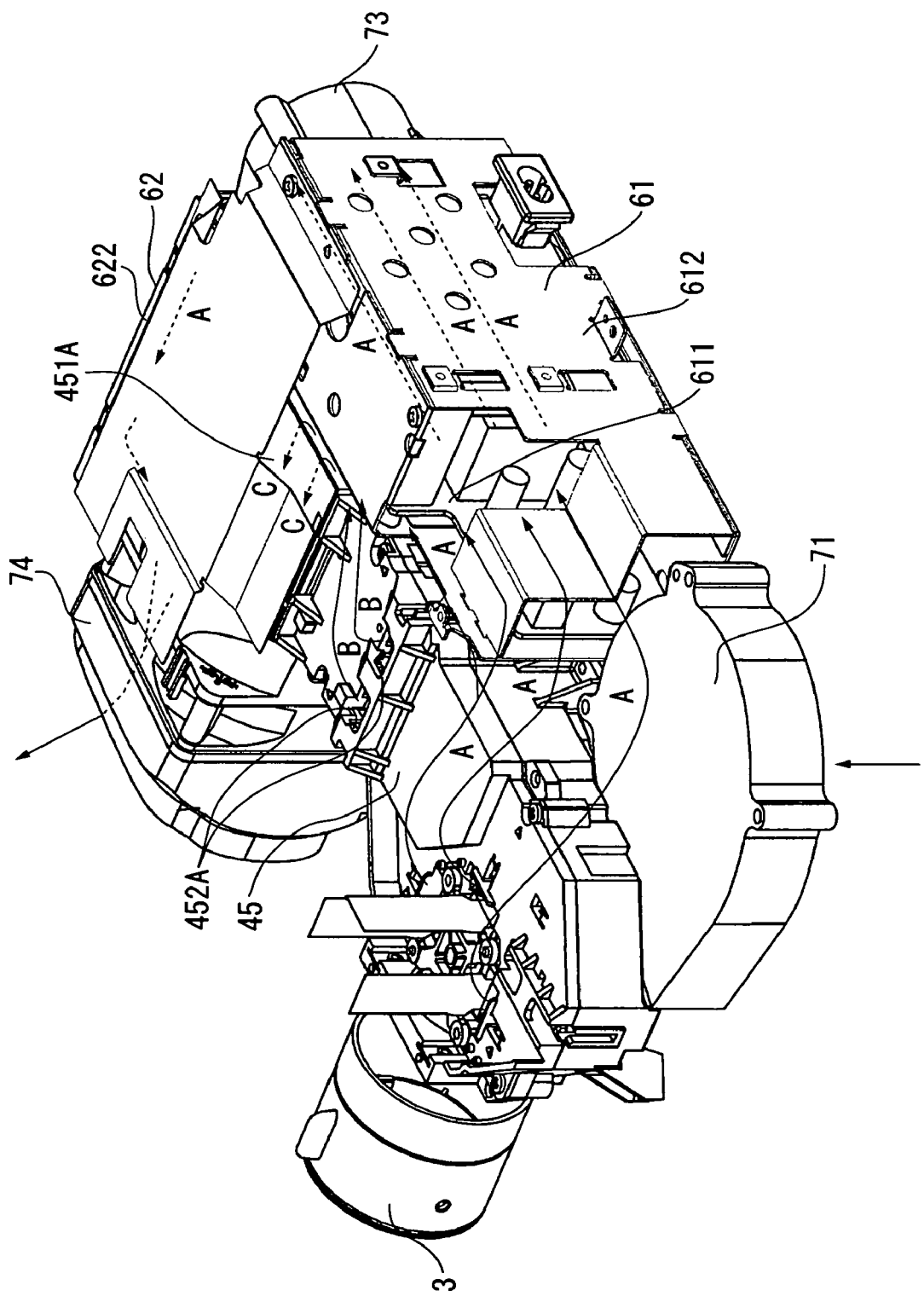

LIGHT SOURCE DEVICE AND PROJECTOR

BACKGROUND OF THE INVENTION

1. Field of the Invention

The present invention relates to a light source device having a light source lamp, a reflector that holds the light source lamp and has a reflection surface for reflecting the light beam irradiated by the light source lamp, and a lamp housing on which the light source lamp and the reflector are attached, and a projector having the light source device.

2. Description of Related Art

Conventionally, a light source unit having a light source lamp and a reflector that holds the light source lamp and reflects the light beam irradiated by the light source lamp has been known (see U.S. Pat. No. 6,300,717).

In the light source unit, the reflector is a glass-made molding, which is shaped in an approximately rectangular pyramid having a curved concave surface therein. The reflector holds the light source lamp at the top of the rectangular pyramid and highly reflective material such as SiO2 and TiO2 are deposited on the inner curved concave surface, which works as a reflection surface. The light beam radially emitted by the light source lamp is reflected by the reflection surface of the reflector to be irradiated in a predetermined direction. Further, four projections projecting in the light-irradiating direction are formed on the four corners of the light-irradiation side (bottom side of the rectangular pyramid) of the reflector.

When the light source unit is housed in a casing such as a lamp housing, the projections of the reflector are brought into contact with a side of the casing to fix the light source unit on the casing after determining the position of the light source unit in the optical axis direction relative to the casing.

However, since the above-described reflector is an approximately rectangular pyramid having a curved concave surface therein and the projections are formed on the corners of the bottom side of the rectangular pyramid, a molding die having complicated shape is required for molding the reflector, so that the manufacture of the reflector becomes difficult.

SUMMARY OF THE INVENTION

An object of the present invention is to provide a light source device and a projector capable of easily manufacturing a reflector and easily positioning the reflector relative to a lamp housing.

A light source device according to an aspect of the present invention has: a light source lamp; a reflector that holds the light source lamp and has a reflection surface that reflects a light beam irradiated by the light source lamp; and a lamp housing on which the light source lamp and the reflector are attached, in which a plurality of projections protruding along the optical axis of the light beam irradiated by the light source lamp are formed, the reflection surface of the reflector has cross section of an approximately concave section and a positioning surface that is abutted to the plurality of projections of the lamp housing to locate the reflector relative to the lamp housing is provided on a distal side of the concave section, the positioning surface being flat and not protruding from the other distal side.

The plurality of projections of the lamp housing may be protruded along the optical axis of the light beam irradiated by the light source lamp, which may be protruded in a direction for the light beam to be irradiated or in a direction opposite to the irradiation direction as long as the projection extends along the optical axis.

Further, the distal side of the concave section of the reflector may be arranged so that the distal end is thickened toward the outside of the reflector or the distal end extends along the periphery of the distal side of the concave section.

When the distal side of the concave reflector extends in a direction orthogonal to the light-irradiating direction of the reflector, the positioning surface may be formed on the extended portion either on the light-irradiation side or light-incident side of the light beam from the light source lamp. When the distal side of the concave reflector extends along the light-irradiating direction of the reflector, the positioning surface may be provided on an end of the distal side of the concave section. The positioning surface may not be formed on the distal side of the concave section of the reflector, but an independent component may be provided on the distal side of the concave section of the reflector to define the positioning surface by the independent component.

According to the above aspect of the present invention, since the plurality of projections are formed on the lamp housing and the positioning surface is provided on the distal side of the concave section of the reflector, the position of the reflector can be easily determined in the optical axis direction relative to the lamp housing.

Further, since the position of the reflector relative to the lamp housing is determined according to the above arrangement, without forming a plurality of projections on the reflector as in a conventional arrangement, the positioning surface of the reflector can be made flat not protruding relative to the other distal side, so that the reflector can be easily manufactured using a simple-shape die.

In the light source device of the above aspect of the present invention, the positioning surface may preferably be continuously flush.

According to the above arrangement, since the positioning surface can be made continuously flush, the reflector can be further easily manufactured using a die having a further simple shape.

In the light source device of the above aspect of the present invention, the plurality of projections may preferably be symmetrically arranged relative to the optical axis of the light beam irradiated by the light source lamp.

According to the above aspect of the present invention, since the plurality of projections are symmetrically arranged relative to the optical axis of the light beam irradiated by the light source lamp, the position of the reflector relative to the lamp housing can be determined not only in the optical axis direction of the light beam but also in an out-plane direction on a plane orthogonal to the optical axis of the light beam.

In the light source device according to the above aspect of the present invention, the positioning surface may preferably have a rectangular profile and the plurality of projections may preferably be formed on the lamp housing corresponding to the corners of the positioning surface.

According to the above aspect of the present invention, since the plurality of projections are formed on the lamp housing corresponding to the corners of the rectangular positioning surface, the position of the reflector relative to the lamp housing can be accurately determined in the optical axis direction of the light beam irradiated by the light source lamp and in an out-plane direction on a plane orthogonal to the optical axis of the light beam.

The light source device according to the above aspect of the present invention may preferably include a light-transmissive component on the distal side of the concave section of the reflector, the light-transmissive component transmitting the light beam irradiated by the light source lamp, and the light-transmissive component may preferably have the positioning surface.

Any material can be used for the light-transmissive component, which may preferably be, for instance, white glass sheet and optical glass. The light-transmissive component may be designed in any manner as long as the positioning surface is formed thereon, which may be formed in a plate or a curved shape.

Since a light-transmissive component independent of the reflector is used as the positioning surface in the present invention, by highly accurately manufacturing the light-transmissive component, the distal side of the reflector itself may not be so highly accurately produced as compared to an arrangement where the distal side of the concave reflector itself is used as the positioning surface. Accordingly, the reflector can be further easily manufactured.

Further, since the light-transmissive component is provided on the distal side of the concave reflector, even when the light source lamp is damaged, the dispersion of the broken pieces of the light source lamp toward the outside of the lamp housing can be prevented by the light-transmissive component.

A projector according to another aspect of the present invention has: the above-described light source device; an optical modulator that modulates a light beam irradiated by the light source device in accordance with image information; and a projection optical device that enlarges and projects the modulated light.

According to the above aspect of the present invention, since the projector is provided with the above-described light source device, the same functions and advantages as the above-described optical device can be obtained. Further, since the reflector can be easily positioned relative to the lamp housing in the light source device, the light source device can be easily provided on a predetermined position on the illumination optical axis defined in the projector, thus facilitating the assembly process of the projector.

BRIEF DESCRIPTION OF THE DRAWINGS

FIG. 18 is another illustration showing the cooling channel formed inside the projector of the aforesaid embodiment.

DETAILED DESCRIPTION OF PREFERRED EMBODIMENT(S)

An embodiment of the present invention will be described below with reference to the attached drawings.

(1) Exterior Arrangement

Figure 1:
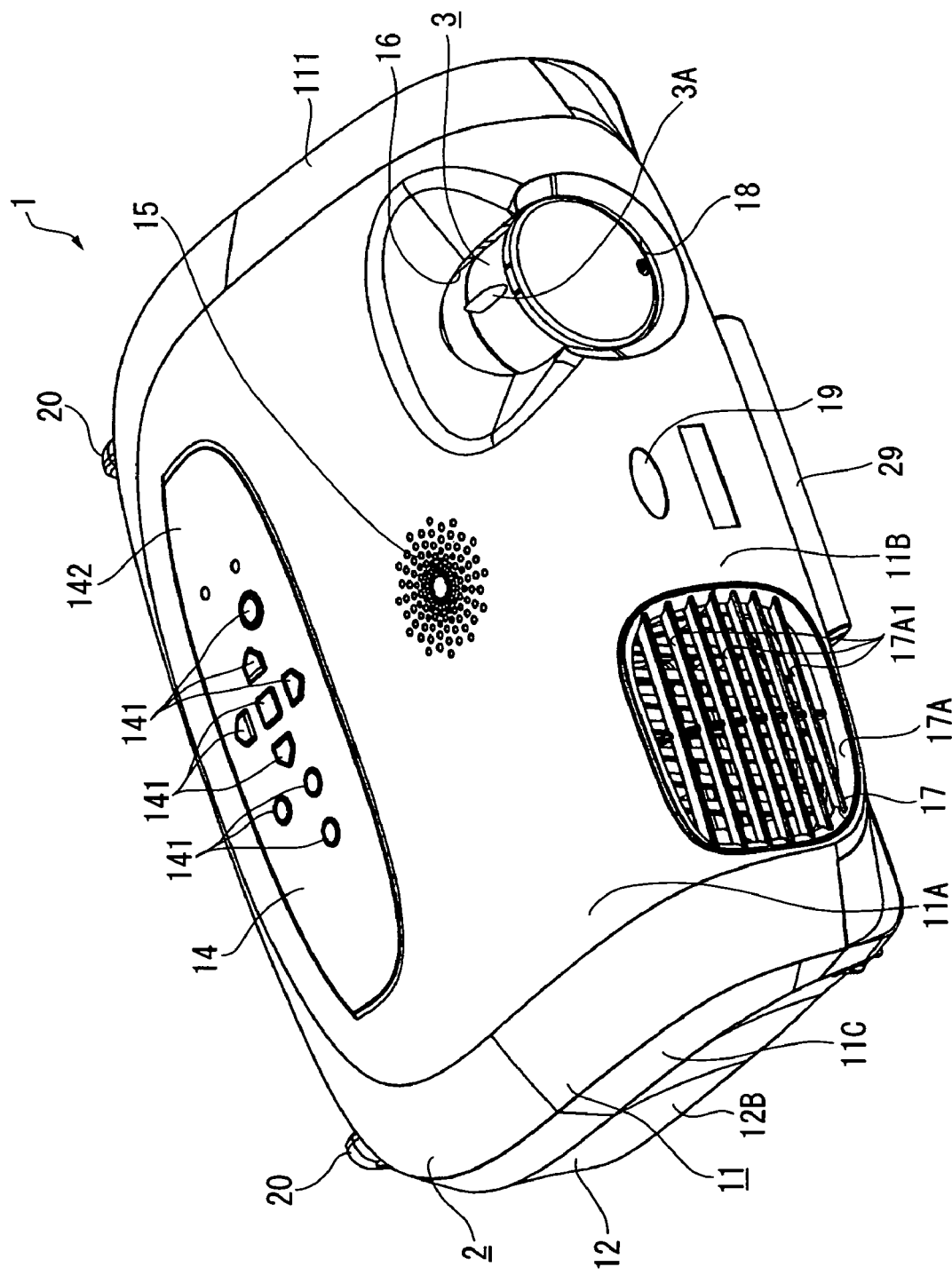
FIG. 1 is a perspective view showing an upper front side of the projector according to an embodiment of the present invention.
Figure 2:
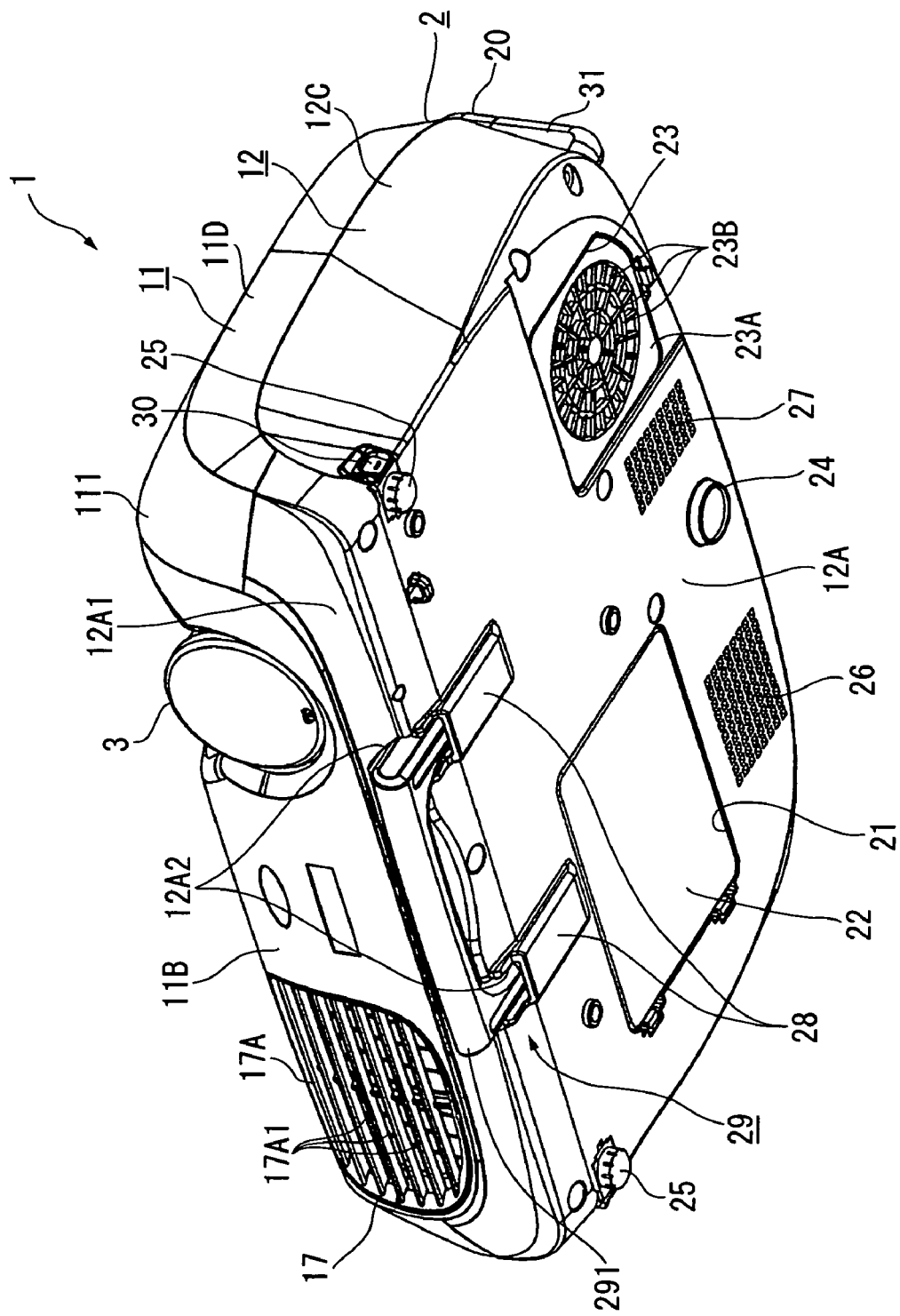
FIG. 2 is a perspective view showing a lower front side of the projector of the aforesaid embodiment.
Figure 3:
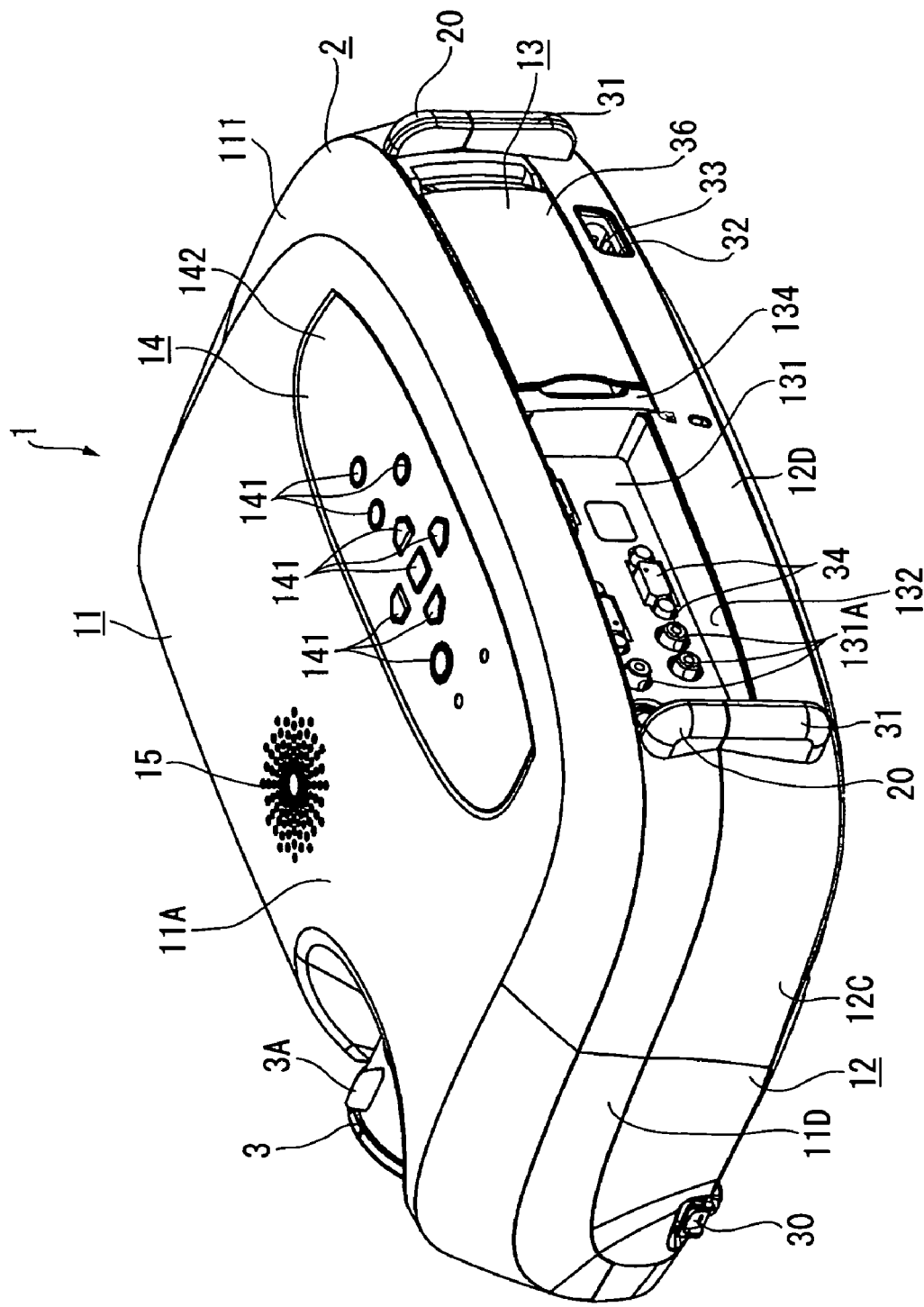
FIG. 3 is a perspective view showing an upper rear side of the projector of the aforesaid embodiment.

FIG. 1 is a perspective view showing an upper front side of a projector 1 according to the present embodiment. FIG. 2 is a perspective view showing a lower front side of the projector 1 of the aforesaid embodiment. FIG. 3 is a perspective view showing an upper rear side of the projector 1 of the aforesaid embodiment.

The projector 1 modulates a light beam irradiated by a light source in accordance with image information and projects the light beam on a projection surface such as a screen in an enlarged manner. As shown in FIGS. 1 to 3, the projector 1 has an approximately rectangular parallelepiped exterior case 2 and a projection lens 3 exposed from the exterior case 2.

The projection lens 3 enlarges and projects an optical image modulated by the body of the projector 1 in accordance with image information. The projection lens 3 is a lens set including a plurality of lenses housed in a cylindrical lens barrel, which has a lever 3A (FIG. 1) for changing the relative position of the plurality of lenses so that the focus and magnification of the projected image can be adjusted.

The exterior case 2 is a synthetic resin casing, which houses the body of the projector 1. As shown in FIGS. 1 to 3, the exterior case 2 has an upper case 11 covering an upper part of the projector 1, a lower case 12 covering a lower part of the projector 1 and a rear case 13 (FIG. 3) covering the rear side of the projector 1. The upper case 11, the lower case 12 and the rear case 13 are fixed by a screw and the like in an attachable/detachable manner.

As shown in FIGS. 1 to 3, the upper case 11 includes an upper section 11A, a front section 11B and lateral sections 11C (FIG. 1) and 11D (FIGS. 2 and 3) respectively constituting the upper side, front side and lateral sides of the projector 1.

As shown in FIG. 1 or FIG. 3, the upper section 11A and the front section 11B are continuously formed from the upper side to the front side of the projector 1 to form a curved convex surface. Further, the right and left edges of the front section 11B, the right and left edges of the upper section 11A and the rear edge of the upper section 11A are chamfered so that the chamfered portion 111 continuously surrounds the upper section 11A and the front section 11B.

As shown in FIG. 1 or FIG. 3, an operation panel 14 for actuating and adjusting the projector 1 horizontally extends approximately at the rear center of the upper section 11A. The operation panel 14 includes push button switches, where a plurality of operation buttons 141 are pushed down to touch tactile switches installed on a circuit board (not shown) disposed inside the operation panel 14, thereby allowing a desired operation. A decorative board 142 is provided on the operation panel 14 to surround the operation buttons 141. The decorative board 142 is a light-guide plate, on which operation names are illuminated at a position corresponding to the operation buttons 141 while the projector 1 is actuated.

Incidentally, the circuit board of the above-described operation panel 14 is electrically connected with a below-described control board so that an operation signal generated by the push-down operation of the operation button 141 is outputted to the control board.

Further, a plurality of holes 15 are formed approximately at the front center of the upper section 11A, so that sound is outputted from a speaker (not shown) disposed thereunder through the holes 15.

A cut 16 for exposing the lever 3A of the above-described projection lens 3 to allow the operation of the lever 3A is formed at a right side (seen from the front side) of the upper section 11A as shown in FIG. 1.

As shown in FIG. 1, an exhaust port 17 is formed at a left side (seen from the front side) of the front section 11B so that the air discharged from a cooling fan disposed therein is exhausted through the exhaust port 17. Further, a louver 17A having a plurality of vanes 17A1 that extend in horizontal direction and are arranged in parallel is attached to the exhaust port 17. The louver 17A not only rectifies the discharged air but also shields the light from the outside to the inside of the projector 1.

As shown in FIG. 1, an approximately circular cut 18 continuous with the above-described cut 16 is formed on the right side (seen from the front side) of the front section 11B. The cut 18 exposes the distal portion of the projection lens 3.

A remote controller light-receiving window 19 is formed approximately at the upper center of the front section 11B (seen from front side) as shown in FIG. 1. A remote controller light-receiving module (not shown) for receiving the operation signal from a below-described remote controller is disposed inside the remote controller light-receiving window 19.

Incidentally, the non-illustrated remote controller light-receiving module is electrically connected with the below-described control board so that the operation signal received by the remote controller light-receiving module is outputted to the control board. Though not illustrated, the remote controller light-receiving window and the remote controller light-receiving module are also provided on the rear side of the projector 1. Accordingly, the remote control operation of the projector 1 can be conducted from both of the front and rear sides of the projector 1 using the remote controller.

As shown in FIGS. 1 to 3, the lateral sections 11C and 11D are bent downward toward the front side and also bent rearward toward the rear side in accordance with the shape of the above-described upper section 11A and the front section 11B.

Vertically extending projections 20 protruding in a direction opposite to the light-projecting direction of the projection lens 3 are formed on the rear end of the lateral sections 11C and 11D.

As shown in FIGS. 1 to 3, the lower case 12 includes a bottom section 12A (FIG. 2), a lateral sections 12B (FIG. 1) and 12C (FIGS. 2 and 3) and a rear section 12D (FIG. 3) respectively constituting the bottom side, lateral side and rear side of the projector 1.

As shown in FIG. 2, a projection 12A1 projecting obliquely upward from a flat plane bottom portion is formed on the bottom section 12A. The projection 12A1 extends to be connected with the chamfered section 111 of the upper case 11 when the upper case 11 and the lower case 12 are connected. The bottom section 12A constitutes the bottom side of the projector 1 and the front side of the projector 1 by being connected with the front section 11B of the upper case 11.

A rectangular opening 21 is formed approximately at the left center (seen from the lower side) of the bottom section 12A. A lamp cover 22 covering the opening 21 is attached to the opening 21 in a detachable manner.

The rear right corner (seen from the lower side) of the bottom section 12A has stepped configuration dented inward. An intake port 23 for drawing in cooling air from the outside is formed at the corner. An intake cover 23A covering the intake port 23 is attached on the intake port 23 in a detachable manner. A plurality of openings 23B are formed on the intake cover 23A. An air filter (not shown) is provided inside the openings 23B to prevent the invasion of dusts toward the inside.

A fixed leg 24 constituting a leg portion of the projector 1 is provided approximately at the rear center of the bottom section 12A (seen from the lower side). Further, an adjustment leg 25 also constituting the leg of the projector 1 is provided on the right and left front corners of the bottom section 12A.

The adjustment leg 25 is constructed of a shaft member advanceably/retractably projecting from the bottom section 12A in an out-plane direction, so that the vertical and horizontal inclination of the projector 1 can be adjusted while an image is projected by the projector 1.

Air circulation holes 26 and 27 for allowing the circulation of the air between the inside and outside of the projector 1 are formed on both sides of the fixed leg 24 on the bottom section 12A. The heat generated on the components inside the projector 1 located corresponding to the air circulation holes 26 and 27 is radiated by the air circulating through the air circulation holes 26 and 27.

Two bulging portions 28 extending in the light-projecting direction are formed on approximately at the center of the front side of the bottom section 12A. The bulging portions 28 have hollow configuration, and a handle 29 used for carrying the projector 1 is provided therein through two holes 12A2 formed on the projection 12A1. The handle 29 includes a planarly-viewed C-shaped handle body 291, the handle body 291 being advanceable and retractable in the light-projecting direction by a body mount (not shown) fixed on the backside of the bottom section 12A. The C-shaped distal portion of the handle body 291 is supported by the body mount (not shown) so that the handle body 291 is capable of rotating by a predetermined angle in an out-plane direction of the bottom section 12A when the handle body 291 protrudes in the light-projecting direction. Specifically, when the projector 1 is suspended by holding the handle body 291, the centroid position of the projector 1 is located on a plane formed by the C-shaped edge of the handle body 291.

As shown in FIGS. 1 to 3, the lateral sections 12B and 12C have a concave curved surface where the front side thereof is curved from the upper side to the lower side and approximate center (in light-projecting direction) thereof is widened outside toward the upper side, and the rear end is curved toward the rear side. The lateral sections 12B and 12C are connected with the lateral sections 11C and 11D of the upper case 11 to form the lateral sides of the projector 1.

As shown in FIGS. 2 and 3, an adjustment button 30 corresponding to the adjustment leg 25 provided on the bottom section 12A is provided on the front side of the lateral sections 12B and 12C. When the adjustment button 30 is pushed, the adjustment leg 25 is advanced and retracted to adjust the vertical and horizontal inclination of the projector 1. Incidentally, though only the adjustment button 30 provided on the lateral section 12C is shown in FIGS. 2 and 3, the adjustment button 30 is also provided on the lateral section 12B.

As shown in FIG. 3, vertically extending projections 31 projecting in a direction opposite to the light-projecting direction of the projection lens 3 are formed on the rear end of the lateral sections 12B and 12C. The projection 31 is connected with the projection 20 formed on the lateral sections 11C and 11D of the above-described upper case 11, the projections 20 and 31 working as legs when the projector 1 is vertically set.

The rear section 12D has a convex curved surface swelling rearward.

As shown in FIG. 3, a rectangular opening 32 is formed on the right side (seen from the rear side) of the rear section 12D and an inlet connector 33 is exposed through the opening 32. Further, though not illustrated, a support section for supporting the lower end of the rear case 13 and a groove for fitting the rear case 13 from the upper side are formed inside the rear section 12D.

Figure 4:
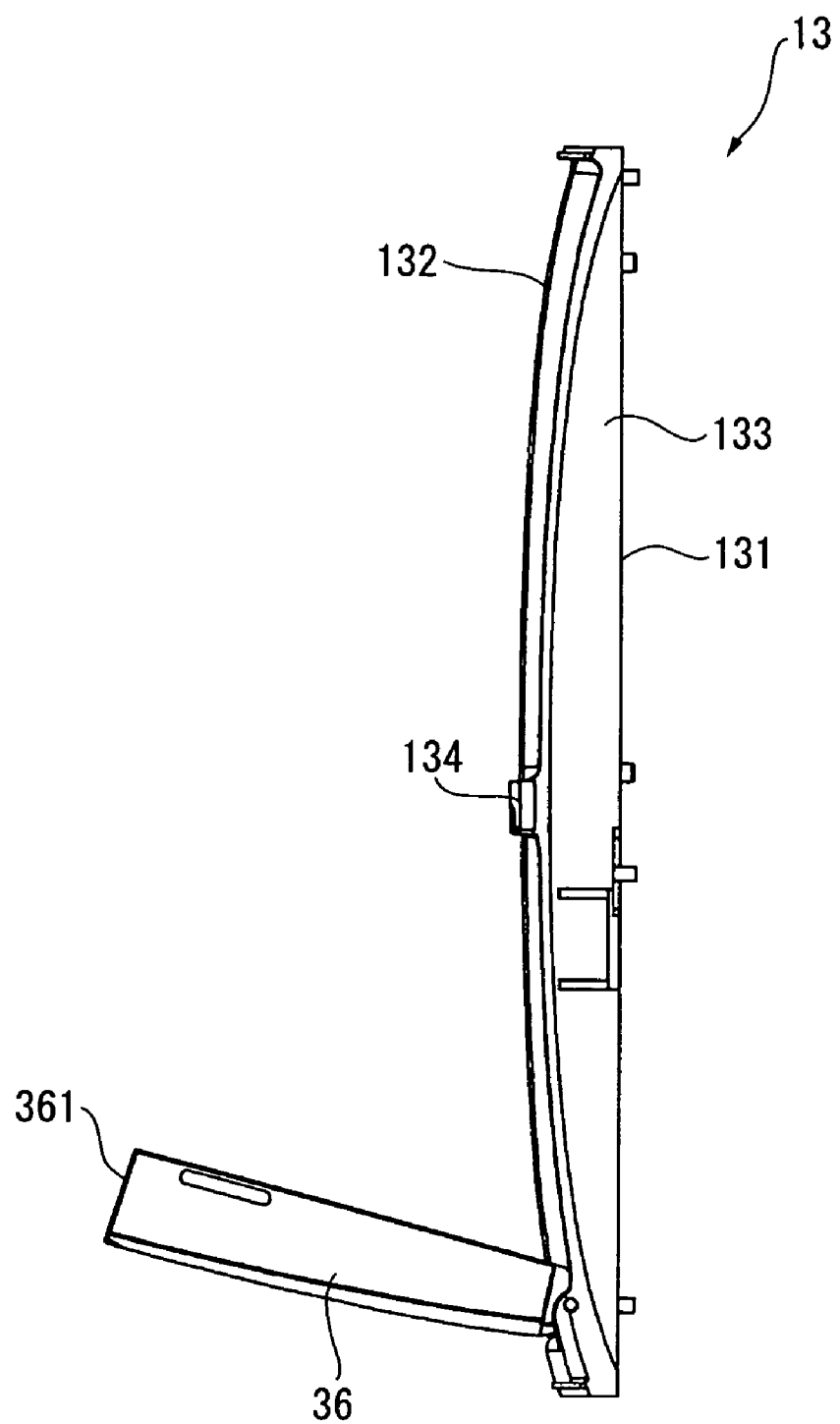
FIG. 4 is a plan view showing an upper side of a rear case of the aforesaid embodiment.

FIG. 4 is a plan view showing an upper side of the rear case 13.

As shown in FIG. 3, the rear case 13 is fittably fixed on the groove (not shown) formed on the inside of the rear section 12D of the lower case 12 to close the opening formed on the rear side when the upper case 11 and the lower case 12 are connected. As shown in FIG. 3 or FIG. 4, the rear case 13 has an approximately rectangular plate body 131, a projection 132 projecting from the lower end of the plate body 131 in approximately orthogonal direction, a projection 133 (FIG. 4) similarly projecting from the upper end of the plate body 131, and a partition 134 projecting from approximately horizontal center of the plate body 131 to divide the rear case 13 into two areas.

As shown in FIG. 4, the distal portion of the projections 132 and 133 are bulged rearward. When the upper case 11, the lower case 12 and the rear case 13 are assembled, the distal end of the projection 132 is connected with the upper end of the rear section 12D of the lower case 12 and the distal end of the projection 133 is connected with the rear end of the upper section 11A of the upper case 11. In other words, the plate body 131 of the rear case 13 is inwardly spaced apart from the rear side of the projector 1.

According to the configuration of the above-described upper case 11, the lower case 12 and the rear case 13, the assembled exterior case 2 has chamfered corners on the upper, front, lateral, bottom and rear sides to have an approximately streamlined shape.

As shown in FIG. 3, the plate body 131 located on the left side (seen from the rear side) divided by the partition 134 has a plurality of holes 131A and a plurality of connector terminals 34 for inputting image signals and sound signals from external electronics are exposed to the outside through the holes 131A. An interface board (not shown) for processing the signal inputted by the connector terminals 34 is disposed inside the plate body 131 located at the area.

Incidentally, the interface board is electrically connected with the below-described control board and the signal processed by the interface board is outputted to the control board.

Figure 5:
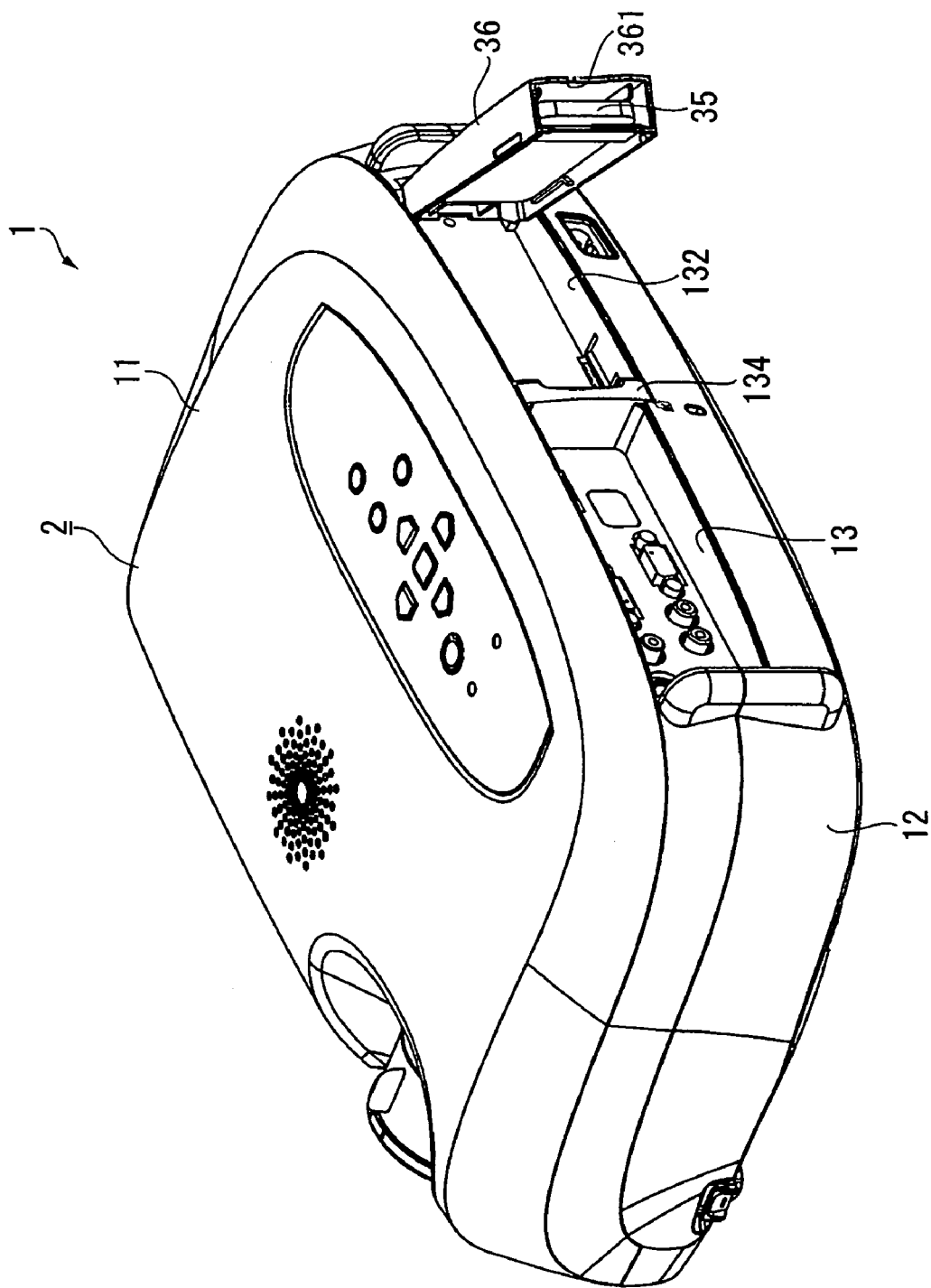
FIG. 5 is an illustration showing a remote controller housing of the rear case of the aforesaid embodiment.

FIG. 5 is an illustration showing where the remote controller 35 is disposed.

As shown in FIGS. 3 to 5, a remote controller housing 36 for accommodating the remote controller 35 (FIG. 5) is provided at the area located on the right side (seen from the rear side) of the rear case 13 divided by the partition 134.

The remote controller 35 is provided with a plurality of operation buttons (not shown) for power on/off operation, image reproduction and stop operation, and sound volume adjustment. The remote controller 35 transmits an operation signal to the internal remote controller light-receiving module through the remote controller light-receiving window 19 from a remote position to remotely operate the projector 1.

As shown in FIG. 5, the remote controller housing 36 is a box-shaped component fitted on the right divided area of the rear case 13 and having an opening 361 on a side thereof, which is constructed of a transparent or translucent material so that the inside thereof can be visually checked. As shown in FIG. 4, the end opposite to the opening 361 is supported by a shaft at the right corner (seen from the rear side) of the projections 132 and 133, so that the remote controller housing 36 is capable of rotating around an axis approximately orthogonal to the upper section 11A or the bottom section 12A of the projector 1.

(2) Internal Arrangement

Figure 6:
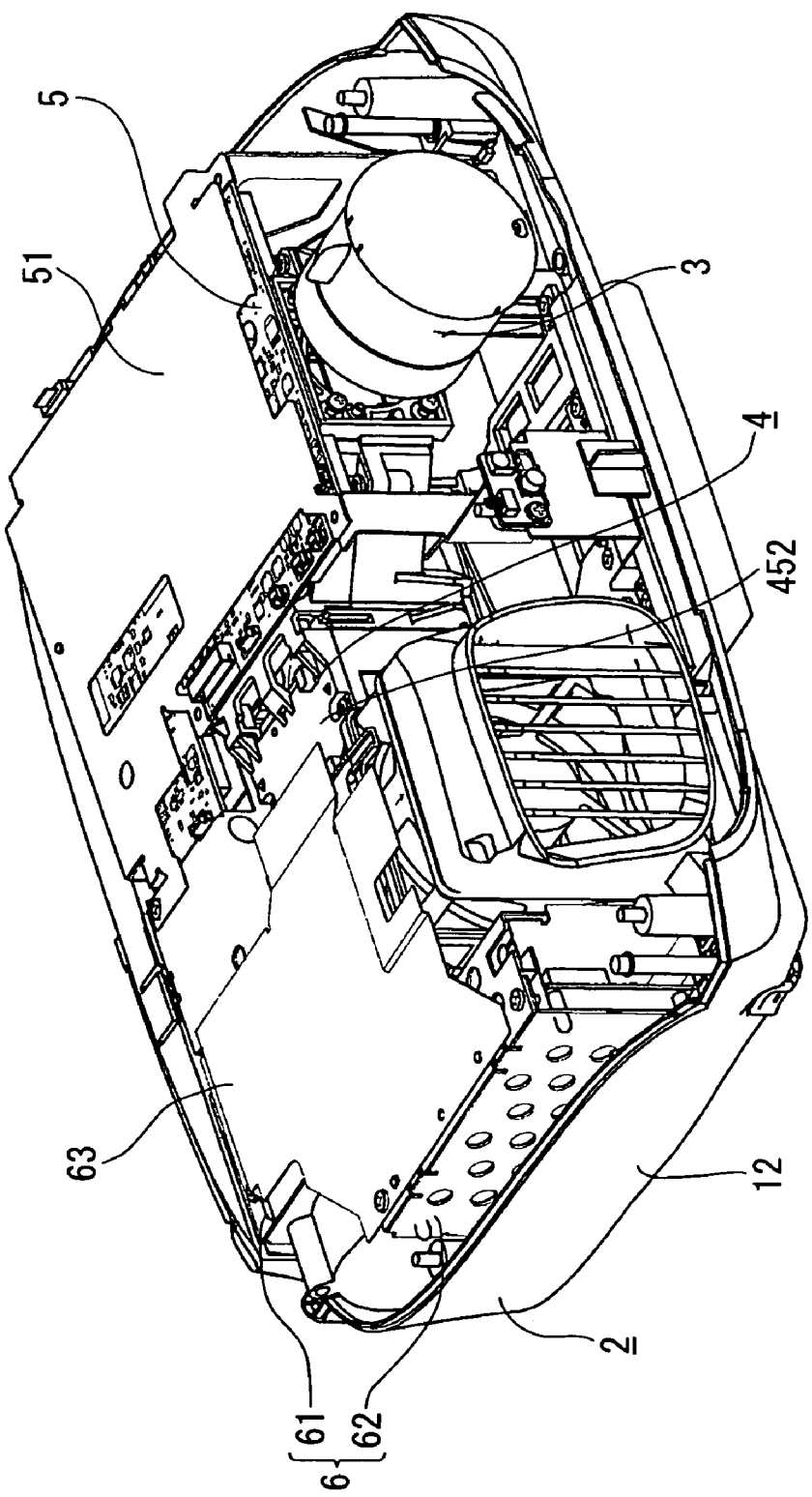
FIG. 6 is an illustration showing an interior structure of the projector of the aforesaid embodiment.
Figure 7:
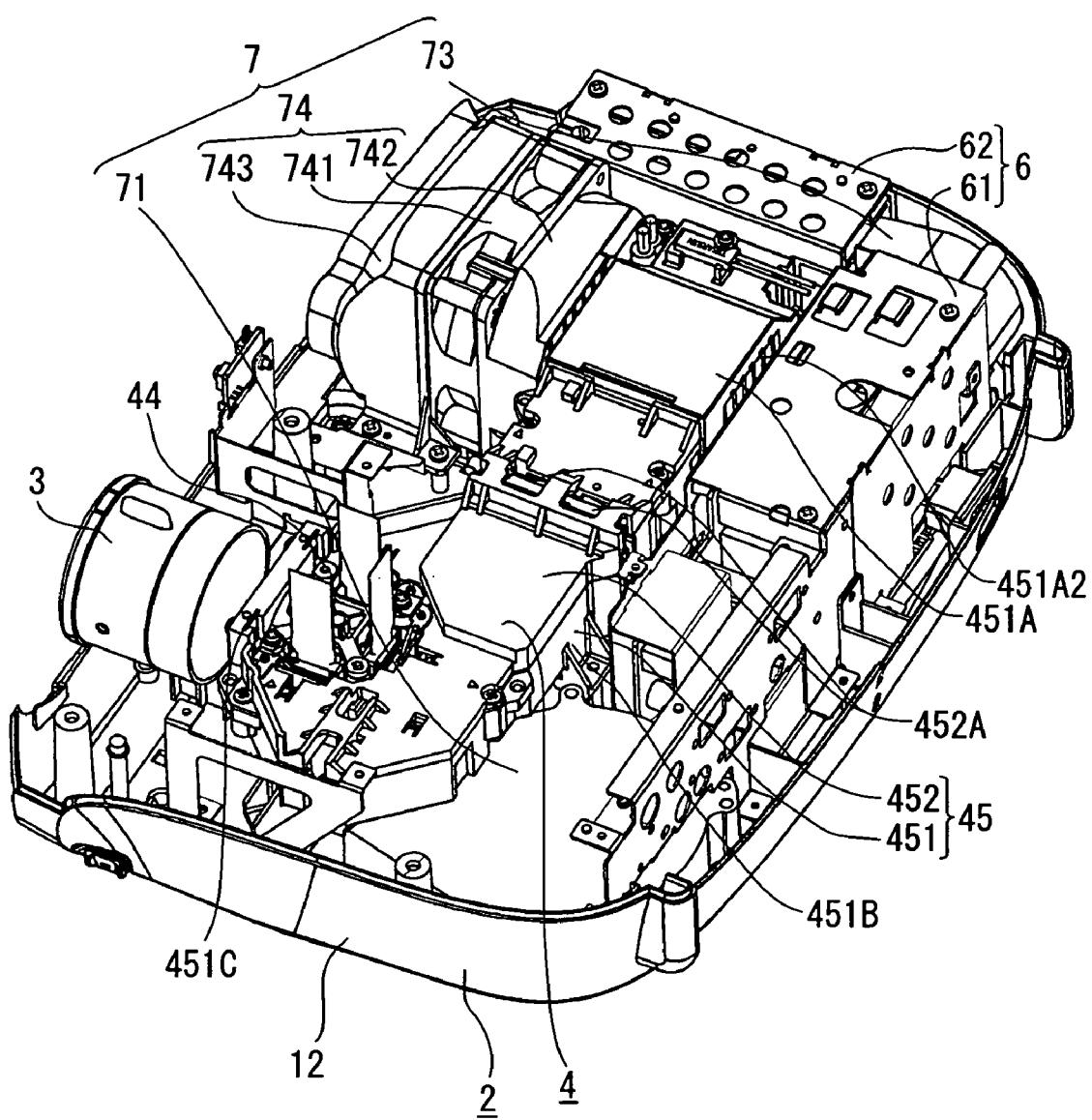
FIG. 7 is another illustration showing the interior structure of the projector of the aforesaid embodiment.

FIGS. 6 and 7 are illustrations showing the internal arrangement of the projector 1. Specifically, FIG. 6 is an illustration of the projector 1 with the upper case 11 being detached, and FIG. 7 is an illustration with the control board and the like being further detached from the projector 1 shown in FIG. 6.

As shown in FIG. 6 or 7, the body of the projector 1 is accommodated inside the exterior case 2, the body including a planarly-viewed L-shaped optical unit 4 (FIG. 7) horizontally extending approximately at the center in the light-projecting direction and having an end extending toward the front side, a control board 5 (FIG. 6) disposed above the optical unit 4 and on the side of the projection lens 3, a power supply unit 6 arranged in an approximately planarly-viewed L-shape along the rear side and one of the lateral sides, and a cooling unit 7 (FIG. 7) including three cooling fans disposed at a position corresponding to the intake port 23 and the exhaust port 17 and at a corner of the power supply unit 6.

(2-1) Structure of Optical Unit 4

Figure 8:
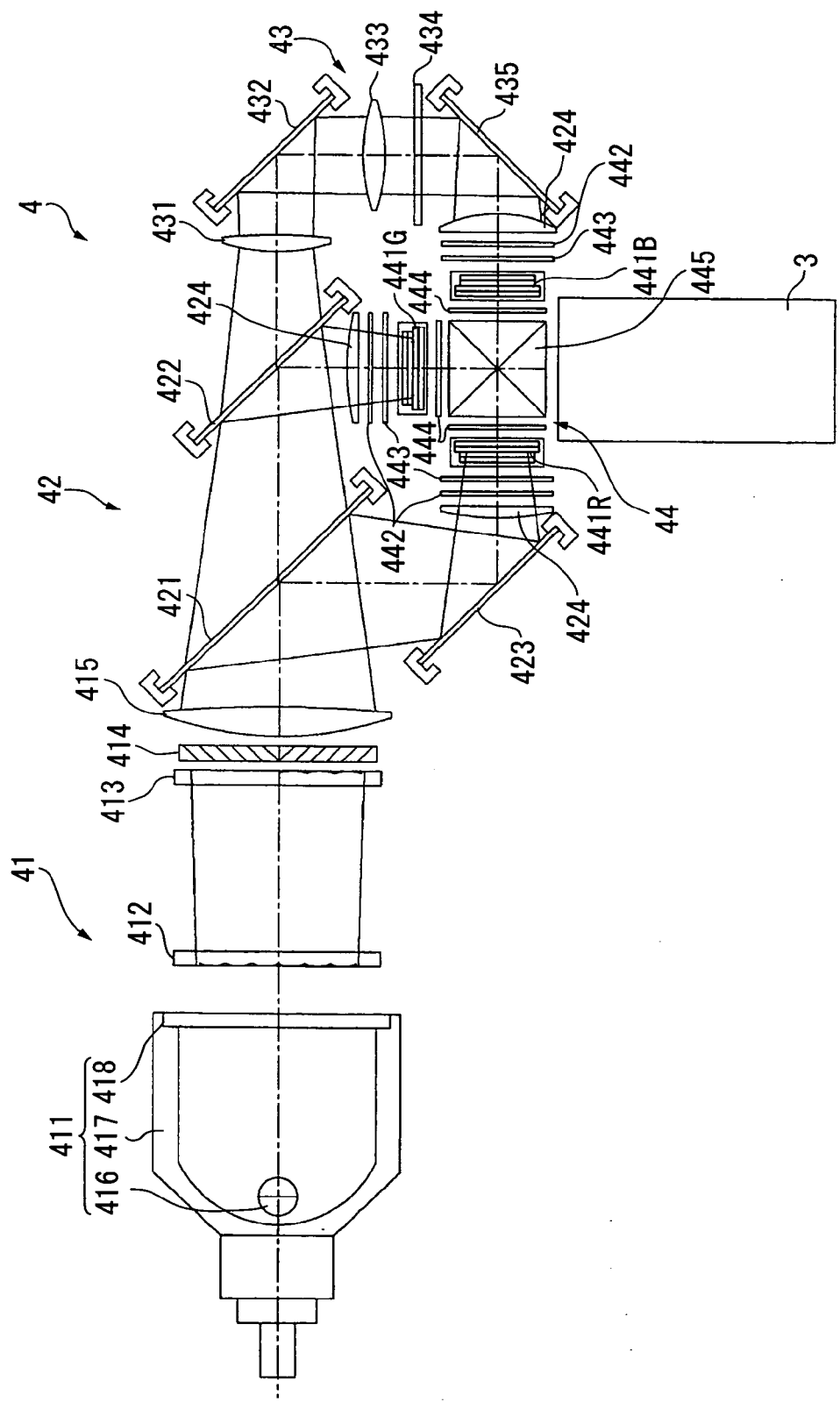
FIG. 8 is a schematic illustration showing an optical system of an optical unit of the aforesaid embodiment.

FIG. 8 is a schematic illustration showing an optical system of the optical unit 4 of the aforesaid embodiment.

The optical unit 4 modulates a light beam irradiated by a light source in accordance with image information to form an optical image, and forms a projected image on a screen through the projection lens 3. As shown in FIG. 7 or 8, the optical unit 4 includes functionally independent components of an integrator illuminating optical system 41, a color-separating optical system 42, a relay optical system 43, an optical device 44 integrating an optical modulator and a color-combining optical device, and a light guide 45 (FIG. 7) in which the optical components 41, 42, 43 and 44 are accommodated.

The integrator illuminating optical system 41 is an optical system for equalizing the illuminance of the light beam irradiated by the light source on a plane orthogonal to the illumination optical axis. As shown in FIG. 8, the integrator illuminating optical system 41 has a light source device 411, a first lens array 412, a second lens array 413, a polarization converter 414 and a superposing lens 415.

The light source device device 411 has a light source lamp 416 (a radial light source), a reflector 417, and an anti-explosion glass 418 covering the light-irradiation side of the reflector 417. The radial light irradiated by the light source lamp 416 is reflected by the reflector 417 to be an approximately parallel light beam and is irradiated toward the outside. In the present embodiment, a high-pressure mercury lamp is used as the light source lamp 416 and a parabolic mirror is used as the reflector 417. Incidentally, the light source lamp 416 may not be a high-pressure mercury lamp but may be a metal halide lamp or a halogen lamp. Further, though a parabolic mirror is used as the reflector 417, a parallelizing concave lens disposed on the irradiation-side of a reflector of an ellipsoidal mirror may alternatively be used. Incidentally, the detailed structure of the light source device 411 will be described below.

The first lens array 412 has small lenses arranged in a matrix, the lenses having a substantially rectangular profile seen in the illumination optical axis direction. The respective lenses separate the light beam irradiated by the light source lamp 416 into sub-beams and emit the sub-beams in the illumination optical axis direction.

The second lens array 413 is arranged approximately in the same manner as the first lens array 412, which includes small lenses arranged in a matrix. The second lens array 413 together with the superposing lens 415 superposes the image of the respective small lenses of the first lens array 412 onto the below-described liquid crystal panels 441R, 441G and 441B of the optical device 44.

The polarization converter 414 converts the light from the second lens array 413 into substantially uniform polarized light, thereby enhancing the light utilization efficiency of the optical device 44.

Specifically, the respective sub-beams converted into substantially uniform polarized light by the polarization converter 414 is substantially superposed on the below-described liquid crystal panels 441R, 441G and 441B of the optical device 44 by the superposing lens 415. Since only one-type of polarized light can be used in a projector using the liquid crystal panels 441R, 441G and 441B that modulate a polarized light, approximately half of the light beam from the light source lamp 416 emitting random polarized light cannot be used. Accordingly, with the use of the polarization converter 414, the light beam irradiated by the light source lamp 416 is converted into substantially uniform polarized light to enhance the light utilization efficiency of the optical device 44. Incidentally, such polarization converter 414 is disclosed in, for instance, Japanese Patent Laid-Open Publication No. H08-304739.

The color-separating optical system 42 has two dichroic mirrors 421 and 422, and a reflection mirror 423. The plurality of sub-beams irradiated by the integrator illuminating optical system 41 are separated into three color lights of red (R), green (G) and blue (B) by the two dichroic mirrors 421 and 422.

The relay optical system 43 has an incident-side lens 431, a relay lens 433, a UV-cut filter 434 and reflection mirrors 432 and 435. The relay optical system 43 guides the color light (blue light) separated by the color-separating optical system 42 toward the below-described liquid crystal panel 441B of the optical device 44.

At this time, the dichroic mirror 421 of the color-separating optical system 42 transmits the green light component and blue light component of the light beam irradiated by the integrator illuminating optical system 41 and reflects the red light component. The red light reflected by the dichroic mirror 421 is reflected by the reflection mirror 423, which reaches to the liquid crystal panel 441R for red color through a field lens 424. The field lens 424 converts the respective sub-beams irradiated by the second lens array 413 into a light beam parallel to the central axis (main beam) thereof. The field lenses 424 provided on the light-incident side of the other liquid crystal panels 441G and 441B function in the same manner.

In the blue and green lights transmitted through the dichroic mirror 421, the green light is reflected by the dichroic mirror 422, which reaches to the liquid crystal panel 441G for green light through the field lens 424. On the other hand, the blue light transmits through the dichroic mirror 422, which passes through the relay optical system 43 to reach the liquid crystal panel 441B for blue light through the field lens 424.

Incidentally, the relay optical system 43 is used for the blue light in order to avoid deterioration in the light utilization efficiency on account of light dispersion and the like caused by the longer length of the optical path of the blue light than the optical path of the other color light. In other words, the relay optical system 43 is used for directly transmitting the sub-beams incident on the incident-side lens 431 to the field lens 424. Incidentally, though the blue light of the three color lights passes through the relay optical system 43, the red light, for instance, may alternatively pass through the relay optical system 43.

The optical device 44 modulates the incident light beam in accordance with image information to form a color image. The optical device 44 has three incident-side polarization plates 442 on which the respective color lights separated by the color-separating optical system 42 are incident, three visual-angle corrector plates 443 disposed on the downstream of the respective incident-side polarization plates 442, the liquid crystal panels 441R, 441G and 441B (optical modulator) and irradiation-side polarization plates 444 disposed on the downstream of the respective visual-angle corrector plates 443, and a cross dichroic prism 445 (color-combining optical device).

The liquid crystal panels 441R, 441G and 441B use, for instance, a polycrystalline silicon TFT as a switching element, which has a pair of opposing transparent substrates with liquid crystal sealed therebetween. The liquid crystal panels 441R, 441G and 441B irradiate the light beam incident thereon through the incident-side polarization plates 442 and the visual-angle corrector plates 443 after modulating in accordance with image information. Incidentally, the liquid crystal panels 441R, 441G and 441B are held and accommodated in a holder frame (not shown).

The incident-side polarization plate 442 transmits a polarized light in a predetermined direction out of the respective color lights separated by the color-separating optical system 42 and absorbs the other light beam, which has a substrate made of sapphire glass and the like with a polarization film attached thereon.

The irradiation-side polarization plate 444 is also arranged substantially in the same manner as the incident-side polarization plate 442, which transmits the polarized light in a predetermined direction out of the light beam irradiated by the liquid crystal panels 441R, 441G and 441B, where the polarization axis of the transmitted polarized light is set orthogonal to the polarization axis of the polarized light transmitted through the incident-side polarization plate 442.

The visual-angle corrector plate 443 has a substrate on which an optical conversion film is formed, the optical conversion film correcting the visual angle of the optical image formed by the liquid crystal panels 441R, 441G and 441B. The visual-angle corrector plate 443 compensates a birefringence generated on the liquid crystal panels 441R, 441G and 441B. The visual field angle of the projection image is enlarged by the visual-angle corrector plate 443 and the contrast of the projected image is enhanced.

The cross dichroic prism 445 combines the optical image irradiated by the irradiation-side polarization plate 444 and modulated for each color light to form a color image. In the cross dichroic prism 445, a dielectric multi-layer film for reflecting the red light and a dielectric multi-layer film for reflecting the blue light are formed along the boundaries of four right-angle prisms approximately in an X-shape, the dielectric multi-layer films combining the three color lights.

The above-described liquid crystal panels 441R, 441G and 441B, the irradiation-side polarization plates 444 and the cross dichroic prism 445 are integrated as a unit.

Figure 9:
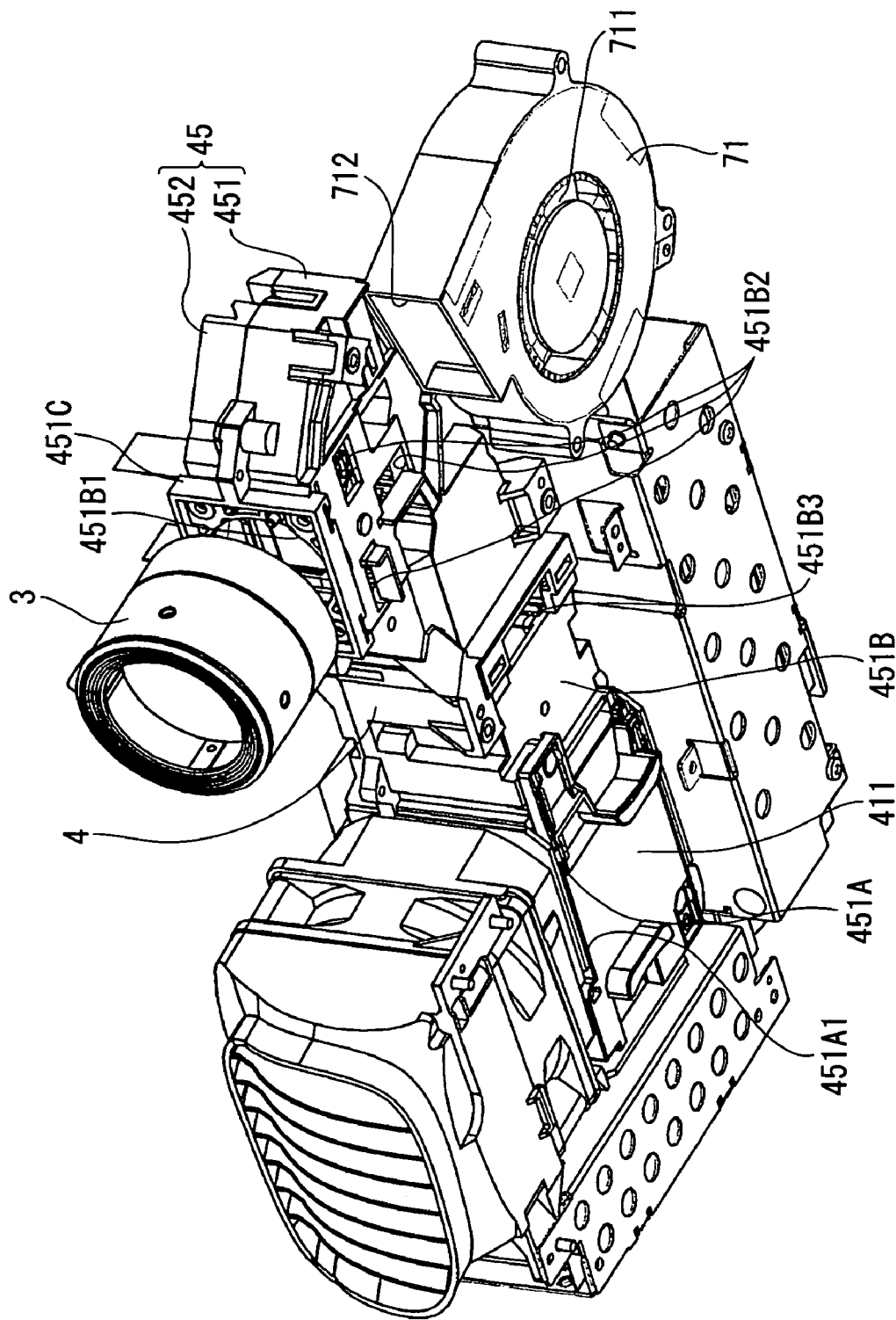
FIG. 9 is an illustration showing a structure of a light guide of the aforesaid embodiment.

FIG. 9 is an illustration showing the structure of the light guide 45.

As shown in FIG. 7 or FIG. 9, the light guide 45 is a synthetic resin component formed by injection molding and the like, which includes a lower light guide 451 for housing the above-described optical components 41, 42, 43 and 44 are housed and an upper light guide 452 for closing the upper opening of the lower light guide 451.

The lower light guide 451 has a light source housing 451A for housing the light source device 411, a component housing 451B having a container shape for the other optical components except for the light source device 411 to be housed, and a projection lens mount 451C formed on the outer surface of the component housing 451B for the projection lens 3 to be mounted.

The light source housing 451A is formed in an approximately box-shape having an opening 451A1 (FIG. 9) located on the lower side and an opening (not shown) provided on the side of the component housing 451B. The light source device 411 is accommodated in the light source housing 451A through the lamp cover 22 (FIG. 2) provided on the bottom section 12A of the lower case 12. A slitted opening (not shown) is formed on the front side of the light source housing 451A. Similarly, a slitted opening 451A2 (FIG. 7) is formed on the rear side of the light source housing 451A. The air can be circulated between the inside and the outside of the light source housing 451A through the openings.

Though not specifically shown, a plurality of grooves for slidably fitting the optical components 412 to 415, 421 to 424 and 431 to 435 are formed inside the component housing 451B. As shown in FIG. 7, the optical device 44 is provided in the component housing 451B on the inner side of the projection lens mount 451C. Further, as shown in FIG. 9, the component housing 451B has an opening 451B1 for transmitting the light beam irradiated by the light source device 411 is formed on the downstream side of the optical device 44. Also as shown in FIG. 9, openings 451B2 are formed at a position corresponding to the three liquid crystal panels 441R, 441G and 441B of the optical device 44 and an opening 451B3 is formed at a position corresponding to the polarization converter 414 of the optical device 44 on the bottom side of the component housing 451B.

The projection lens mount 451C is located surrounding the opening 451B1 of the component housing 451B, which holds the projection lens 3 at a predetermined position relative to the illumination optical axis set inside the light guide 45. The optical image irradiated by the light source device 411 and formed by the optical device 44 is enlarged and projected by the projection lens 3 through the opening 451B1.

As shown in FIG. 7, the upper light guide 452 closes the upper opening of the component casing 451B of the lower light guide 451 except for the upper side of the optical device 44. A plurality of openings (an opening 452A, for instance) are formed on the upper light guide 452 penetrating the top and bottom sides thereof, so that the attitude of the optical components accommodated in the lower light guide 451 can be adjusted through the opening.

(2-2) Structure of Control Board 5

As shown in FIG. 6, the control board 5 is disposed above the upper light guide 452 of the light guide 45. The control board 5 is a circuit board having a processor such as a CPU (Central Processing Unit) installed thereon, which controls the operation of the entire projector 1. The control board 5 controls the drive of the liquid crystal panels 441R, 441G and 441B based on the signal outputted by the above-described interface board. The liquid crystal panels 441R, 441G and 441B modulate the light beam to form an optical image. Further, an operation signal outputted by the circuit board of the above-described operation panel 14 and the non-illustrated remote-controller light-receiving module is inputted to the control board 5 and the control board 5 outputs a control command to the components of the projector 1 based on the operation signal.

As shown in FIG. 6, a first shield plate 51 of aluminum plate is attached to the upper side of the control board 5. The first shield plate 51 shields the electromagnetic wave radiated by circuit elements installed on the control board 5 as well as the external electromagnetic wave, thereby avoiding electromagnetic interference. The first shield plate 51 may be made of metal other than aluminum or, alternatively, may be made of a component of synthetic resin and the like of which surface is plated, processed by metal evaporation or attached with a metal foil.

(2-3) Structure of Power Supply Unit 6

Figure 10:
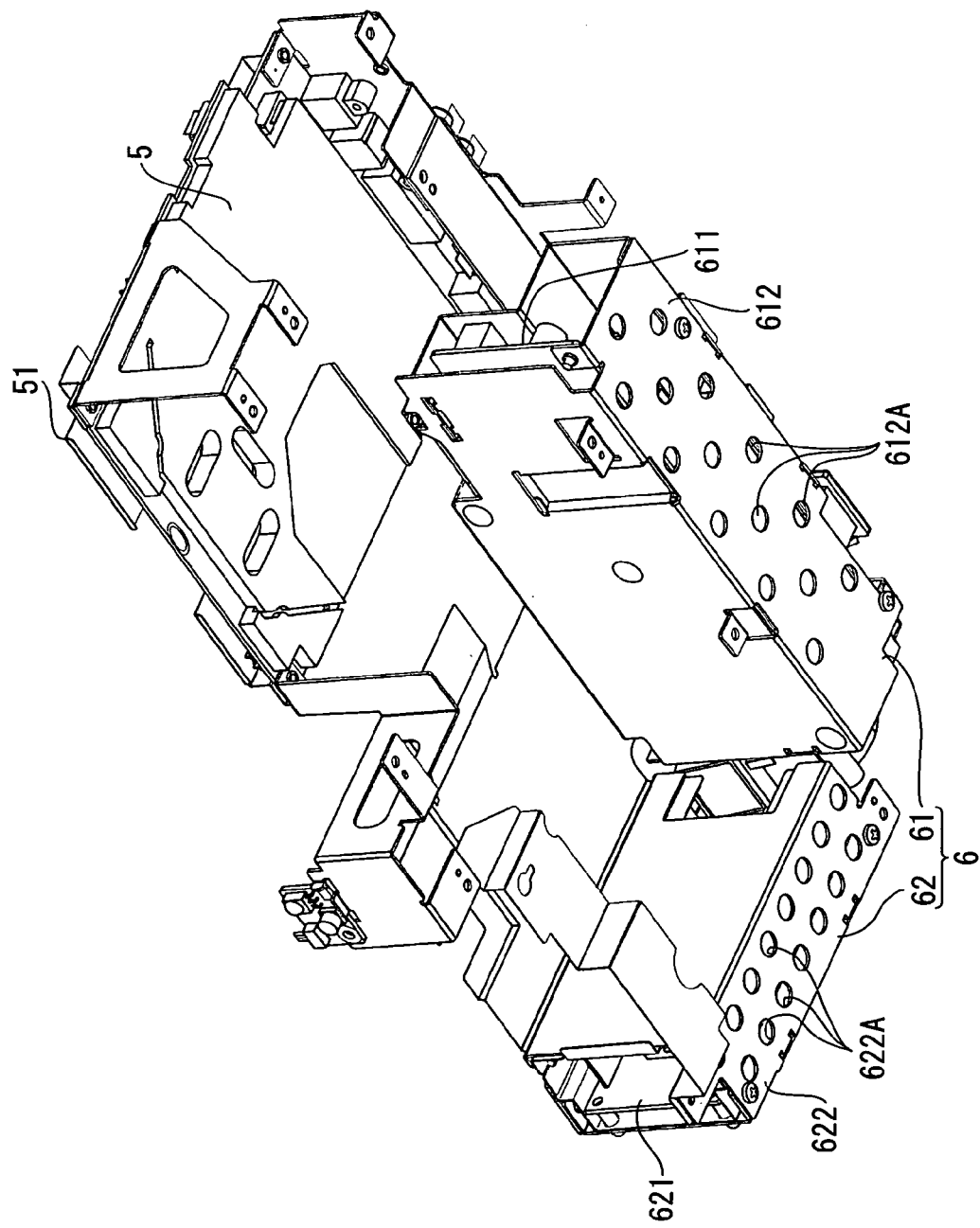
FIG. 10 is an illustration showing a structure of a power supply unit of the aforesaid embodiment.

FIG. 10 is an illustration showing the structure of the power supply unit 6. Specifically, FIG. 10 is an illustration showing the power supply unit 6 from the lower side.

The power supply unit 6 supplies electric power to the light source device 411, the control board 5 and the like. As shown in FIG. 6 or 7, the power supply unit 6 has a power supply block 61 disposed along the rear side of the exterior case 2 and a light source drive block 62 disposed along one of the lateral sides of the exterior case 2, which is formed in a planarly-viewed L-shape surrounding the light source housing 451A of the light guide 45.

The power supply block 61 supplies the electric power supplied from the outside through the power cable connected to the inlet connector 33 to the light source drive block 62, the control board 5 etc. As shown in FIG. 10, the power supply block 61 has a circuit board 611 having a transformer for converting the inputted alternate-current into a low-voltage direct-current and a converter for converting the output of the transformer into a predetermined voltage on one side thereof, and a tube component 612 (shield component) covering the circuit board 611. The tube component 612 is made of aluminum and is formed in an approximately box-shape with both ends being opened. A plurality of holes 612A are formed on a side of the tube component 612 not opposing to the light source housing 451A and the side opposing to the slitted openings 451A2 (FIG. 7) formed on the backside surface of the light source housing 451A is a continuous flat surface without any holes etc.

The light source drive block 62 supplies electric power to the light source device 411 with a stable voltage. As shown in FIG. 10, the light source drive block 62 has a circuit board 621 on which a transformer for transforming the electric power supplied by the power source block 61 into predetermined electric power, a capacitor for accumulating the electric power, a resistor and the like are installed, and a tube component 622 as a shield component covering the circuit board 621. Among the components, the tube component 622 is made of aluminum in the same manner as the tube component 612 of the power supply block 61, which is formed in an approximately box-shape with both ends thereof being opened. Further, in the same manner as the tube component 612, a plurality of holes 622A are formed on a side of the tube component 622 not opposing to the light source housing 451A and a continuous surface having no hole etc. is formed at a side opposing to the light source housing 451A.

Further, as shown in FIG. 6, a second shield plate 63 as a plate-shaped shield component made of aluminum is attached to the upper end of the power supply block 61 and the light source drive block 62. The second shield plate 63 covers the upper side of the light source housing 451A of the light guide 45 and extends toward a below-described exhaust device 74 of the cooling unit 7.

The tube components 612 and 622 and the second shield plate 63 may be made of metal other than aluminum or, alternatively, may be made of a component of synthetic resin and the like of which surface is plated, processed by metal evaporation or attached with a metal foil.

(2-4) Structure of Cooling Unit 7

Figure 11:
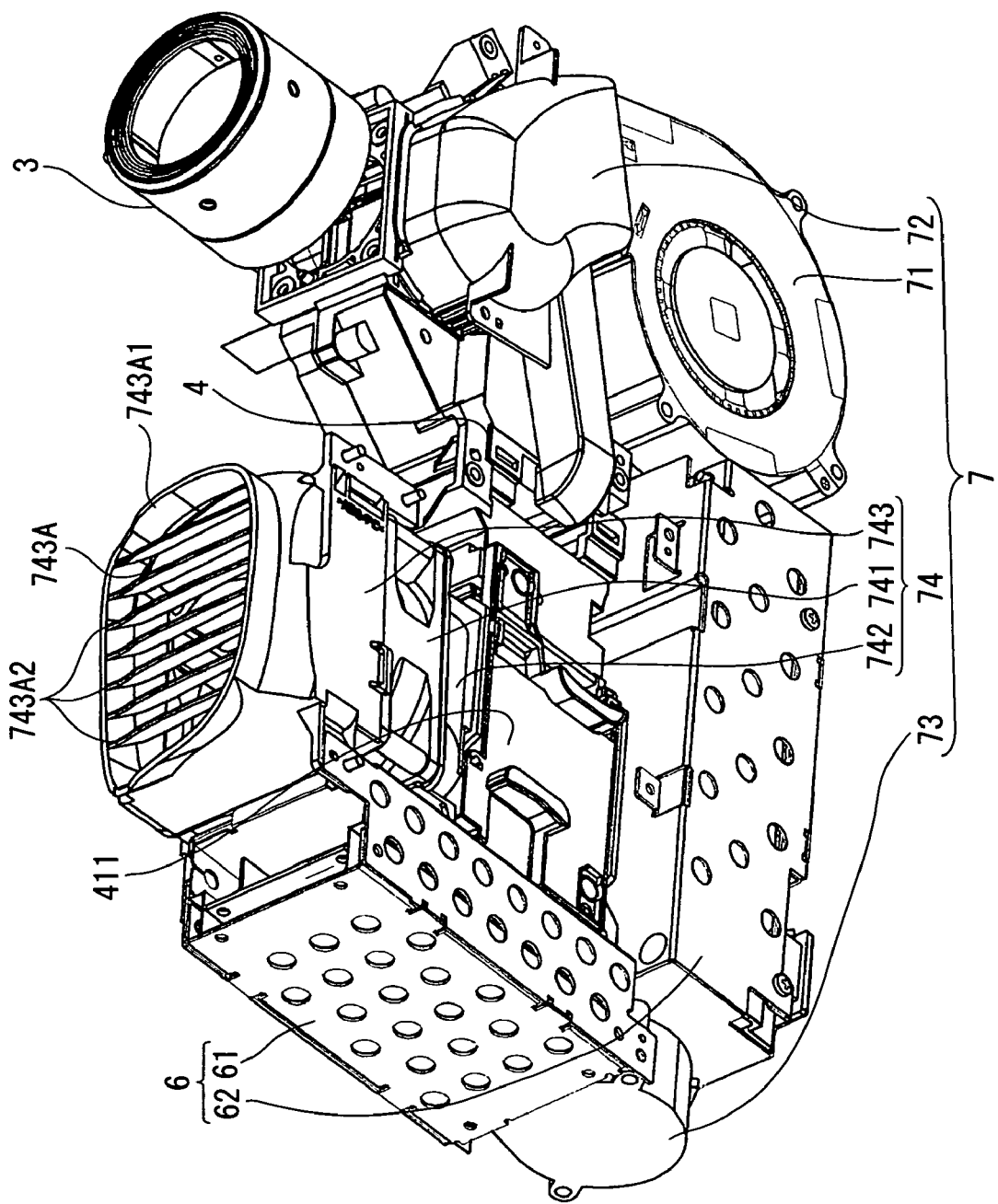
FIG. 11 is an illustration showing a structure of a cooling unit of the aforesaid embodiment.
Figure 12:
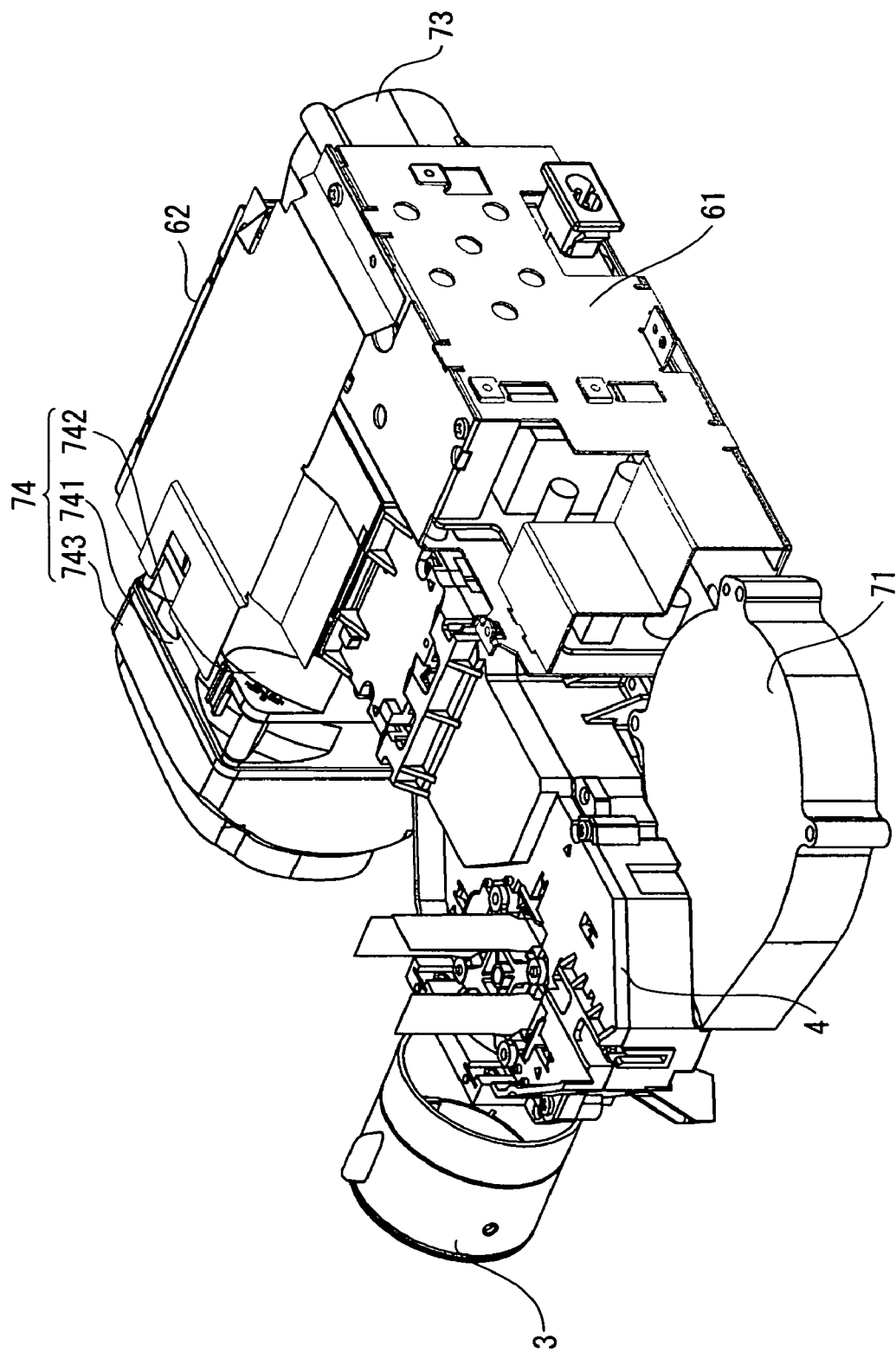
FIG. 12 is another illustration showing the structure of the cooling unit of the aforesaid embodiment.

FIGS. 11 and 12 are illustrations showing a structure of the cooling unit 7. Specifically, FIG. 11 is an illustration showing a lower side of the body section of the projector 1 and FIG. 12 is an illustration showing the upper side of the body section.

The cooling unit 7 cools heat sources inside the projector 1. As shown in FIGS. 7, 11 and 12, the cooling unit 7 has a sirocco fan 71 for introducing external cooling air to the inside of the projector 1, an intake-side duct 72 for guiding the cooling air discharged by the sirocco fan 71 toward a predetermined position, a sirocco fan 73 as a centrifugal fan for circulating the cooling air to the power supply unit 6, and the exhaust device 74 for discharging the air heated inside the projector 1 to the outside.

The sirocco fan 71 is disposed at a position corresponding to the intake port 23 (FIG. 2) formed on the bottom section 12A of the exterior case 2, the sirocco fan 71 having an intake hole 711 (FIG. 9) for drawing in the cooling air that opposes to the intake port 23 and a discharge port 712 (FIG. 9) for discharging the drawn cooling air that faces the lower side of the optical unit 4.

As shown in FIG. 11, the intake-side duct 72 is disposed on the lower side of the optical unit 4 and the introduction port of the cooling air (not shown) is connected with the discharge port 712 of the sirocco fan 71. The intake-side duct 72 has four outlets (not shown) for blowing out the cooling air, the outlets being connected with the openings 451B2 and 451B3 (FIG. 9) formed on the bottom side of the light guide 45.

As shown in FIGS. 7, 11 and 12, the sirocco fan 73 is disposed between the power supply block 61 and the light source drive block 62 of the power supply unit 6, i.e. at the corner section of the L-shape of the power supply unit 6, which has an intake port (not shown) for drawing in the cooling air that opposes to the power supply block 61 and a discharge port (not shown) for discharging the drawn cooling air that opposes to the light source drive block 62.

As shown in FIGS. 7, 11 and 12, the exhaust device 74 extends from the front side of the light source housing 451A of the light guide 45 to the front side of the exterior case 2. The exhaust device 74 is a unit integrating an axial-flow exhaust fan 741, an exhaust-side first duct 742 for introducing the air inside the projector 1 toward the intake of the axial flow fan 741, and an exhaust-side second duct 743 for introducing the air discharged by the axial-flow exhaust fan 741 to the exhaust port 17 of the exterior case 2. A rectifying louver 743A1 having a plurality of vanes 743A2 that vertically extend with front sides thereof being inclined in a direction to be away from the projection lens 3 is provided on an outlet 743A of the exhaust-side second duct 743.

(3) Structure of Light Source Device 411

Figure 13:
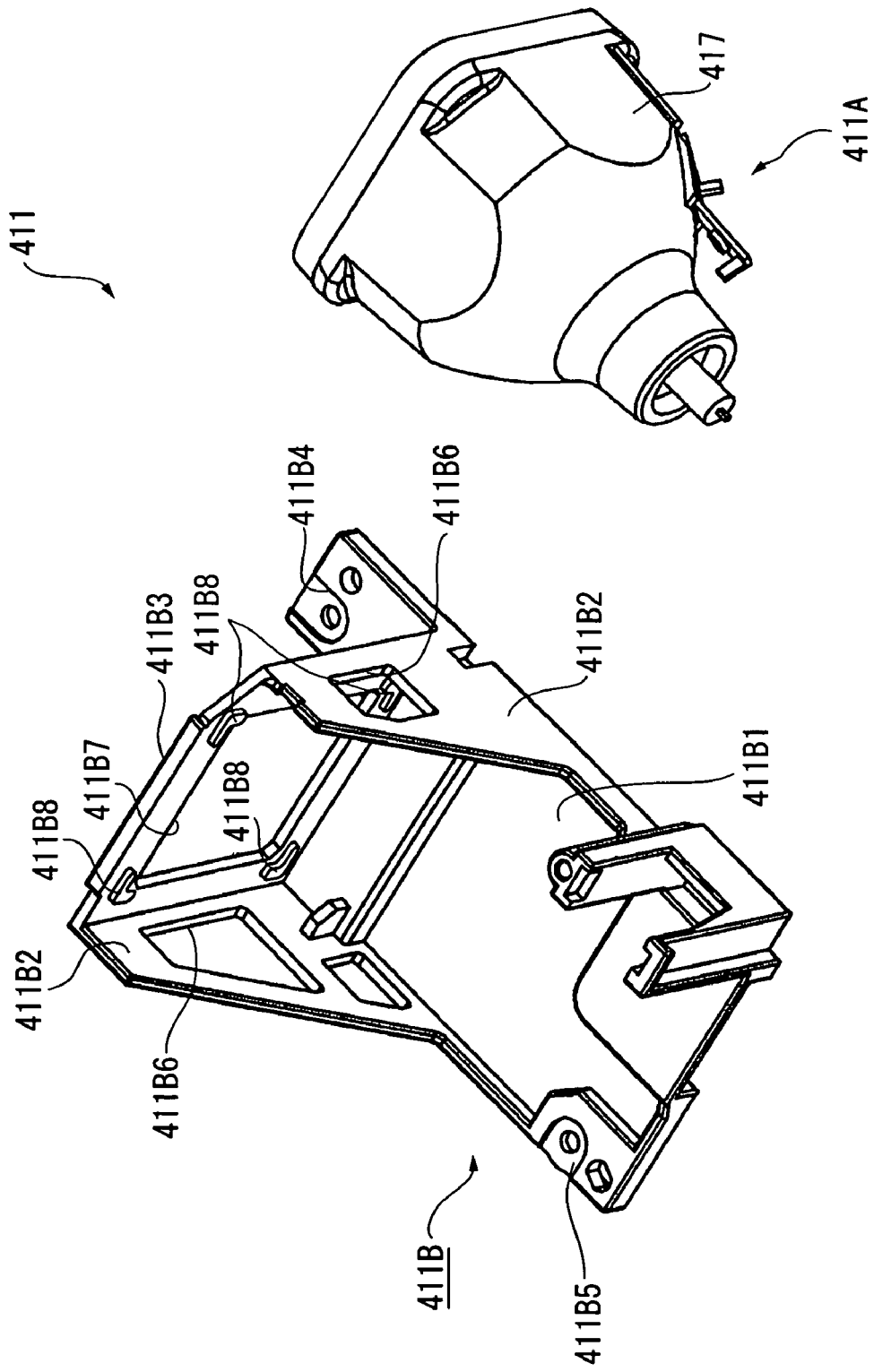
FIG. 13 is an exploded perspective view showing a rear side of a light source device of the aforesaid embodiment.
Figure 14:
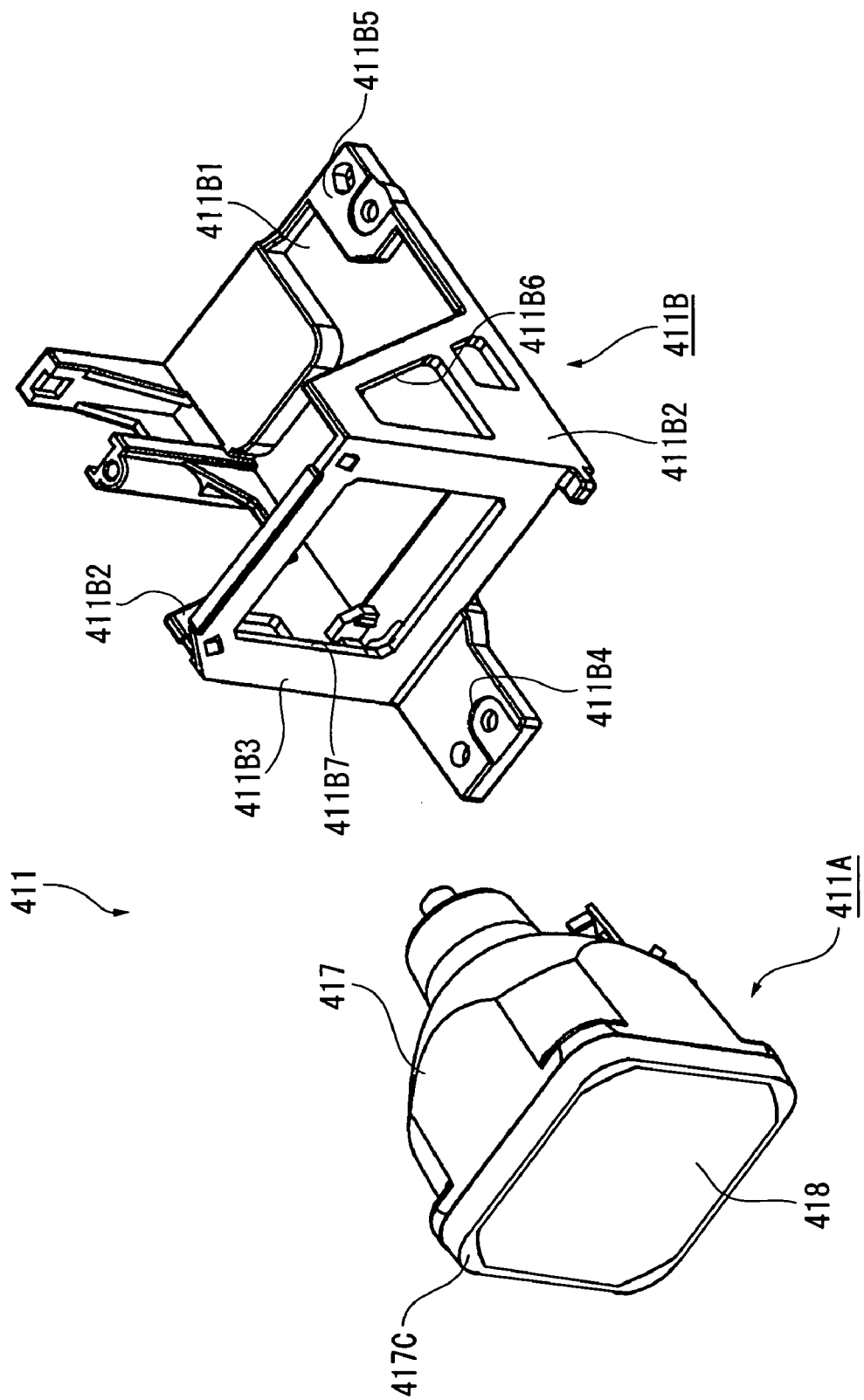
FIG. 14 is an exploded perspective view showing a front side of the light source device of the aforesaid embodiment.

FIG. 13 is an exploded perspective view showing a rear side of the light source device 411. FIG. 14 is an exploded perspective view showing a front side of the light source device 411.

As shown in FIGS. 13 and 14, the light source device 411 has a lamp body 411A and a lamp housing 411B for accommodating the lamp body 411A, the light source device 411 being attachable to and detachable from the light source housing 451A (FIG. 9) of the light guide 45.

The lamp body 411A has the light source lamp 416 (FIG. 8), the reflector 417 that holds the light source lamp 416 and has a revolution paraboloid mirror-shaped reflection surface thereinside, and the anti-explosion glass 418 (FIG. 14) covering the opening of the reflector 417.

The light source lamp 416 is made of a high-pressure mercury lamp that emits a light beam by an arc discharge generated by applying a voltage between mutually opposing electrodes disposed within a light-emitting tube. Incidentally, in the following description, the center of the arc discharge is described as a light source L.

Figure 15:
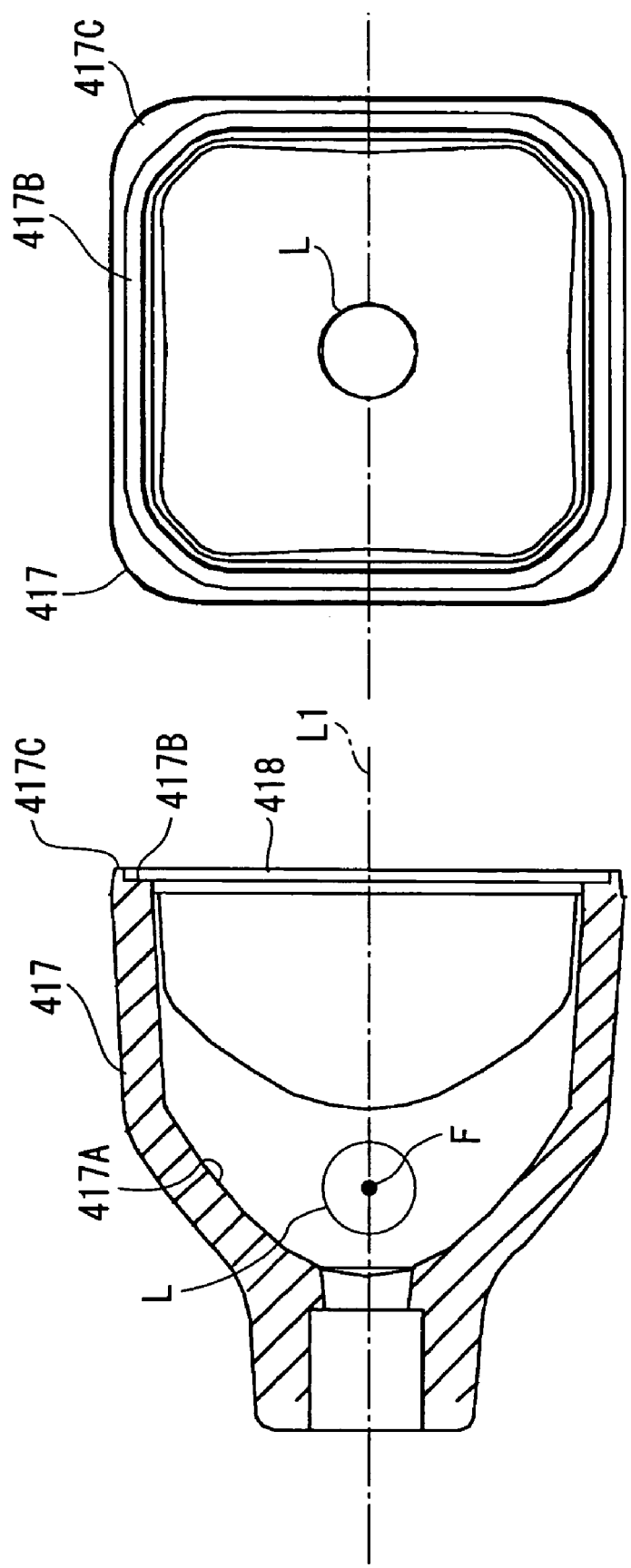
FIG. 15 is an illustration showing a reflector of the aforesaid embodiment.

FIG. 15 is an illustration showing the structure of the reflector 417. Specifically, FIG. 15(A) is a cross section of the reflector 417 and FIG. 15(B) is a front elevational view of the reflector 417.

The reflector 417 is a glass-made molding, which is, as shown in FIG. 15(A), formed in a rotary parabolic shape having therein a reflection surface 417A on which a material such as $SiO_2$ and $TiO_2$ having high reflectivity is deposited. The light source lamp 416 is fixed at the top of the rotary parabolic shape of the reflector 417 and the light source L is located around the focus F of the reflector 417.

In the reflector 417, the opening section of the rotary parabolic shape has an approximately rectangular profile with the corners thereof being curved as shown in FIG. 15(B). The periphery of the opening has stepped configuration of which height gets taller from the inner side of the opening toward the outside. The inner side of the periphery is an anti-explosion glass mount surface 417B for mounting the anti-explosion glass 418, where the anti-explosion glass 418 is fixed by an adhesive and the like. The outer side of the periphery is a positioning surface 417C for locating the lamp body 411A relative to the lamp housing 411B.

As shown in FIG. 15, the positioning surface 417C is located on a plane orthogonal to an illumination optical axis L1 of the light beam irradiated by the light source L, which extends in a continuously flush manner.

The anti-explosion glass 418 has the approximately identical plan shape as the anti-explosion glass mount surface 417B of the reflector 417 and has thickness approximately identical with the step dimension between the anti-explosion glass mount surface 417B and the positioning surface 417C. The anti-explosion glass 418 is fitted to the stepped portion between the anti-explosion glass mount surface 417B and the positioning surface 417C and is abutted to the anti-explosion glass mount surface 417B at an end thereof. Incidentally, a heat resistance glass may be used for the anti-explosion glass 418.

As shown in FIGS. 13 and 14, the lamp housing 411B has a bottom section 411B1 opposing to the lower side of the lamp body 411A, lateral sections 411B2 vertically extending from the opposing ends of the bottom section 411B1 to be opposed to the right and left sides of the lamp body 411A, and a front section 411B3 vertically extending from the bottom section 411B1 and disposed on the light-irradiation side of the lamp body 411A.

The bottom section 411B1 is an approximately rectangular plate body, which has fixing portions 411B4 and 411B5 that support the lamp body 411A and fix the lamp housing 411B accommodating the lamp body 411A to the light guide 45. As shown in FIG. 9, when the light source device 411 is accommodated in the light source housing 451A of the lower light guide 451, a screw is inserted to the fixing portions 411B4 and 411B5 and is screwed to a screw hole (not shown) formed on the bottom side of the lower light guide 451 to accommodate and fix the light source device 411 to the lower light guide 451.

The lateral section 411B2 vertically extends from the opposing front ends of the bottom section 411B1 (light-irradiation side of the lamp body 411A) and is formed in an approximately planarly-viewed triangular shape. An opening 411B6 for flowing the cooling air circulated by the cooling unit 7 to the right and left sides of the lamp body 411A is formed on the lateral sections 411B2.

The front section 411B3 vertically extends from the front end of the bottom section 411B (light-irradiation end of the lamp body 411A) and has right and left sides being connected with the lateral sections 411B2. A rectangular opening 411B7 for transmitting the light beam irradiated by the lamp body 411A and projections 411B8 orthogonal to the front section 411B3 and extending toward the inside of the lamp housing 411B are formed on the front section 411B3.

The projection 411B8 are formed on four points corresponding to the four corners of the positioning surface 417C of the reflector 417 in a symmetrical manner relative to the optical axis irradiated by the lamp body 411A, the projections 411B8 having a planar profile approximately identical with the planar profile of the four corners of the positioning surface 417C.

Figure 16:
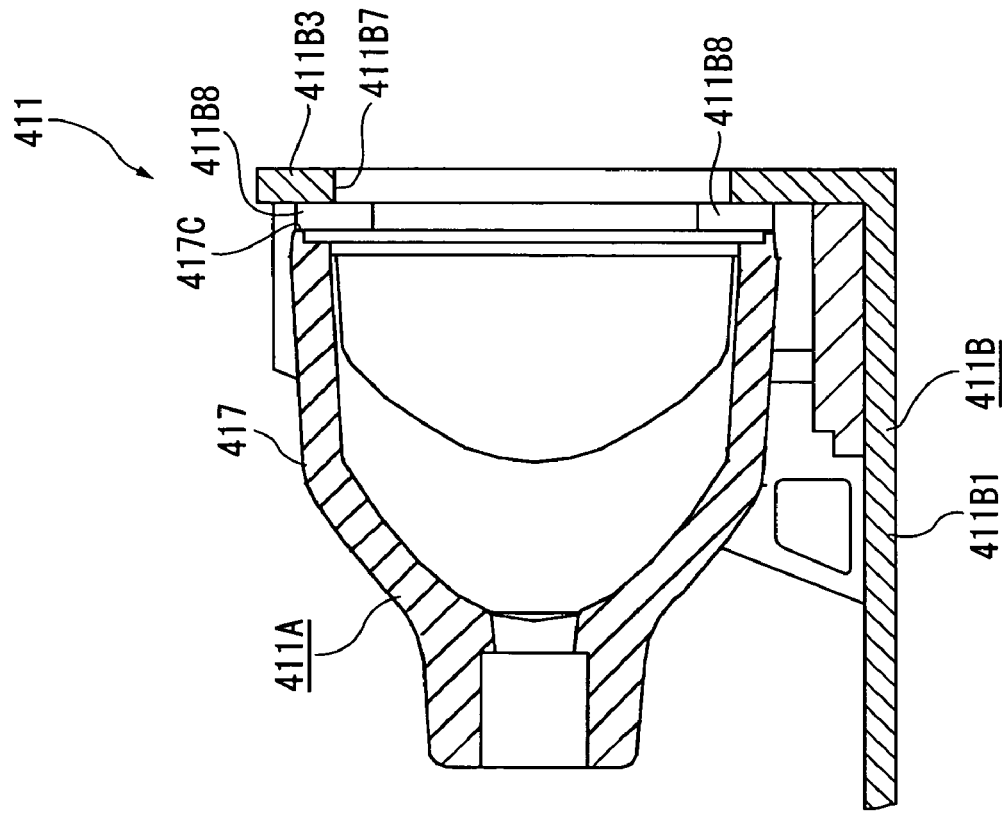
FIG. 16 is an illustration showing how a lamp body is housed in a lamp housing of the aforesaid embodiment.

FIG. 16 is an illustration showing how the lamp body 411A is housed in the lamp housing 411B.

As shown in FIG. 16, after determining the position of the lamp body 411A in the optical axis direction relative to the lamp housing 411B by bringing the projections 411B8 of the front section 411B3 of the lamp housing 411B into contact with the four corners of the positioning surface 417C of the reflector 417, the lamp body 411A is fixed on the lamp housing 411B.

(4) Cooling Mechanism

Next, the cooling structure of the inside of the projector 1 by the cooling unit 7 will be described below.

Figure 17:
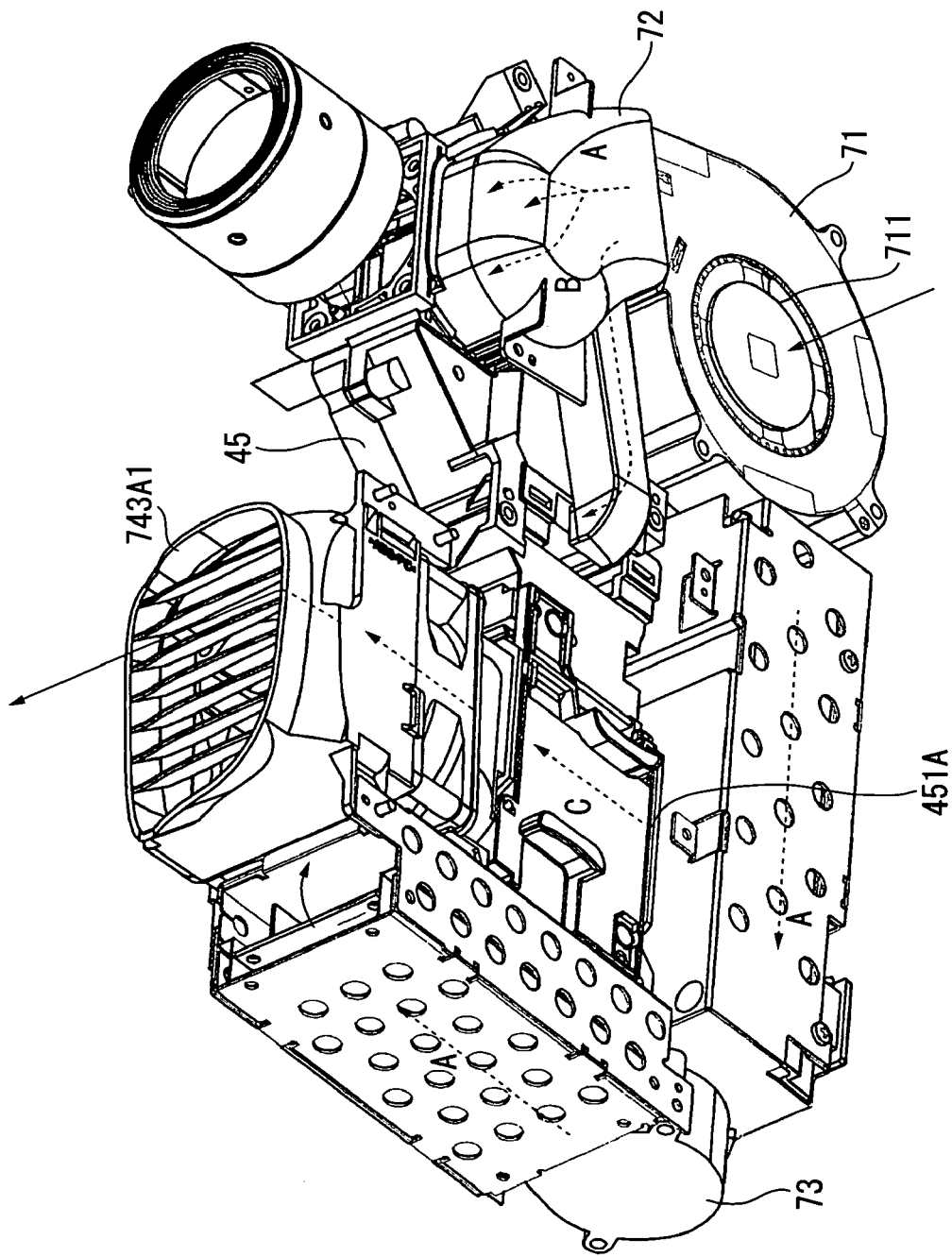
FIG. 17 is an illustration showing a cooling channel formed inside the projector of the aforesaid embodiment.

FIGS. 17 and 18 are illustrations showing the cooling channels formed inside the projector 1.

As shown in FIGS. 17 and 18, a panel/power supply cooling channel A that mainly cools the liquid crystal panels 441R, 441G and 441B and the power supply unit 6, a polarization converter cooling channel B that mainly cools the polarization converter 414, and a light source cooling channel C that mainly cools the light source device 411 are formed by the above-described cooling unit 7.

The panel/power supply cooling channel A is formed by circulating the cooling air inside the projector 1 as follows.

As shown in FIG. 17, the external cooling air is drawn in by the intake port 23 (FIG. 2) formed on the bottom section 12A of the exterior case 2 by the sirocco fan 71 and is discharged to the intake-side duct 72. The cooling air is introduced to the inside of the light guide 45 through the opening 451B2 (FIG. 9) formed on the bottom side of the light guide 45 being guided by the intake-side duct 72.

The cooling air introduced to the inside of the light guide 45 flows from the lower side of the optical device 44 toward the upper side thereof while cooling the liquid crystal panels 441R, 441G and 441B, the incident-side polarization plates 442, the visual-angle corrector plates 443 and the irradiation-side polarization plates 444, which outflows toward the outside of the light guide 45. The air flowed to the outside of the light guide 45 is drawn by the sirocco fan 73 and flows along the control board 5 while cooling the control board 5 (FIG. 6) and is introduced to the inside of the power supply block 61.

The air introduced to the inside of the power supply block 61 flows along the tube component 612 while cooling the circuit elements installed on the internal circuit board 611, which is drawn in by the sirocco fan 73 and is discharged to the inside of the light source drive block 62. The air discharged to the inside of the light source drive block 62 is attracted by the axial-flow exhaust fan 741 of the exhaust device 74, which flows along the tube component 622 while cooling the circuit elements installed on the circuit board 621 (FIG. 10) to be drawn in by the exhaust device 74. Then, as shown in FIG. 17, the air is rectified by the rectifying louver 743A1 of the exhaust device 74 in a direction to be away from the light-projecting direction and is discharged from the exhaust port 17 of the exterior case 2.

The polarization converter cooling channel B is formed by circulating the cooling air inside the projector 1 as follows.

As shown in FIG. 17, the external cooling air is drawn in by the intake port 23 (FIG. 2) formed on the bottom section 12A of the exterior case 2 by the sirocco fan 71 and is discharged to the intake-side duct 72. The cooling air is introduced to the inside of the light guide 45 through the opening 451B3 (FIG. 9) formed on the bottom side of the light guide 45 being guided by the intake-side duct 72. The cooling air being introduced to the inside of the light guide 45 cools the polarization converter 414 and is discharged to the outside of the light guide 45 from the opening 452A formed on the upper light guide 452, as shown in FIG. 18.

The light source cooling channel C is formed by circulating the cooling air inside the projector 1 as follows.

A part of the cooling air flowing through the panel/power supply cooling channel A and the cooling air flowing through the polarization converter cooling channel B are attracted by the exhaust device 74 as shown in FIG. 18, which enter between the power supply block 61 and the light source housing 451A of the light guide 45 and are introduced to the inside of the light source housing 451A from the opening 451A2 (FIG. 7) formed on the backside surface of the light source housing 451A. The air introduced inside the light source housing 451A cools the lamp body 411A through the opening 411B6 (FIGS. 13 and 14) formed on the lateral section 411B2 of the lamp housing 411B and is drawn in by the exhaust device 74 through an opening (not shown) formed on the front side of the light source housing 451A. Then, the air drawn in by the exhaust device 74 is rectified by the rectifying louver 743A1 in a direction to be away from the light-projecting direction and is discharged from the exhaust port 17 of the exterior case 2.

(5) Advantages of Embodiment

According to the above-described embodiment, following advantages can be obtained.

(5-1) The light source device 411 has the lamp body 411A including the light source lamp 416, the reflector 417 and the anti-explosion glass 418, and the lamp housing 411B for accommodating the lamp body 411A. The positioning surface 417C is formed on the peripheral portion of the opening of the rotary parabolic surface of the reflector 417 and the four projections 411B8 are provided on the front section 411B3 of the lamp housing 411B. Accordingly, when the lamp body 411A is accommodated in the lamp housing 411B, the position of the lamp body 411A relative to the lamp housing 411B can be easily determined in the optical axis direction by bringing the projections 411B8 of the lamp housing 411B into contact with the positioning surface 417C of the reflector 417.

(5-2) Since the position of the lamp body 411A relative to the lamp housing 411B is determined by the projections 411B8 and the positioning surface 417C, the positioning surface 417C can be formed in a continuous flush shape without providing the plurality of projections on the reflector 417 as in the conventional arrangement, thereby allowing facilitated production of the reflector 417 using a simple-shape die.

(5-3) Since the projections 411B8 formed on the lamp housing 411B are symmetrically formed relative to the optical axis of the light beam irradiated by the lamp body 411A, the position of the light beam in the optical axis direction can be easily determined and the position of the front section 411B3 of the lamp housing 411B can be easily determined in the out-plane direction.

(5-4) The positioning surface 417C of the reflector 417 has a rectangular shape. Further, the projections 411B8 are provided on four points on the lamp housing 411B corresponding to the four corners of the positioning surface 417C. Accordingly, the position of the lamp body 411A can be accurately determined relative to the lamp housing 411B in both the optical axis direction of the light beam irradiated by the lamp body 411A and in the out-plane rotary direction of the front section 411B3 of the lamp housing 411B.

(5-5) The anti-explosion mount surface 417B is formed on the opening of the revolution paraboloid reflector 417 and the anti-explosion glass 418 is provided on the anti-explosion glass mount surface 417 to cover the opening. Accordingly, even when the light source lamp 416 is damaged, the light source lamp 416 is not dispersed to the outside of the lamp housing 411B, i.e. to the inside of the component housing 451B of the light guide 45 by the presence of the anti-explosion glass 418.

(6) Modifications of Embodiment

Incidentally, the scope of the present invention is not restricted to the above embodiment but includes following modifications as long as an object of the present invention can be achieved.

In the above embodiment, the positioning surface 417C may be arranged as follows.

For instance, the peripheral portion of the opening of the reflector 417 is made flush. And the anti-explosion glass 418 is bonded and fixed on a predetermined position on the peripheral portion of the opening. Then, on the peripheral portion of the opening of the reflector, the area other than the area on which the anti-explosion glass 418 is mounted is arranged as the positioning surface 417C. The positioning surface 417C is formed at a position dented relative to the distal end of the lamp body 411A (light-irradiation side of the anti-explosion glass 418). In other words, the positioning surface 417C may be arranged as a flat surface not protruding from the other distal side of the lamp body 411A. In the above arrangement, the positioning surface 417C may not be continuously extended by changing the size of the anti-explosion glass 418.

Though the projections 411B8 protrude in a direction opposite to the optical axis direction of the light beam irradiated by the lamp body 411A from the inner side of the front section 411B3 of the lamp housing 411B in the above embodiment, other arrangement is possible. For instance, the projections 411B8 may protrude in the light-irradiating direction along the optical axis of the light beam irradiated by the lamp body 411A from the exterior side of the front section 411B3 of the lamp housing 411B. Further, though the positioning surface 417C of the reflector 417 is formed on the light-irradiation side of the revolution paraboloid shape of the reflector 417, other arrangement is possible. For instance, the distal side of the revolution paraboloid shape of the reflector 417 may extend in a direction away from the optical axis. And the rear side of the extension may be arranged as the positioning surface. The positioning surface may preferably formed continuously flush as in the above-described positioning surface 417C.

According to the above arrangement, the position of the lamp body 411A relative to the lamp housing 411B can be determined as follows.

An opening slightly greater than the approximate center in the light-irradiation direction of the lamp body 411A is formed on the front section 411B3 of the lamp housing 411B and the lamp body 411A is inserted through the opening. Then, the projection protruding from the exterior side of the front section 411B3 of the lamp housing 411B is brought into contact with the positioning surface of the reflector 417 and the position of the lamp body 411A is determined relative to the lamp housing 411B.

Though the positioning surface 417C of the reflector 417 is formed on the light-irradiation side of the revolution paraboloid shape of the reflector 417, other arrangement is possible, where an independent component is provided on the distal side of the revolution paraboloid shape of the reflector 417 and the independent component may be arranged as the positioning surface. For instance, a side of the anti-explosion glass 418 provided on the anti-explosion glass mount surface 417B of the reflector 417 is arranged as the positioning surface. According to the above arrangement, since the side of the anti-explosion glass 418 can be accurately produced, not so high accuracy is required for the light-irradiation side of the revolution paraboloid shape of the reflector 417 itself. Accordingly, the reflector 417 can be further easily manufactured.

Though the anti-explosion glass 418 is formed in a plate-shape in the above embodiment, the anti-explosion glass 418 may be curved.

The number of the projections 411B8 may not be four corresponding to the corners of the positioning surface 417C as in the above embodiment. Further, the projection 411B8 may have an approximately rectangular planar shape corresponding to the planar profile of the positioning surface 417C so that the projection 411B8 is in contact with the entire positioning surface 417C.

Though a projector using three optical modulators are taken as an example in the above embodiment, the present invention may be applied to a projector using a single optical modulator, two optical modulators or more than three optical modulators.

Though a liquid crystal panel is used as the optical modulator in the above embodiment, an optical modulator other than the liquid crystal panel such as a device using a micro-mirror may be used.

Though a transmissive optical modulator having different light-incident side and light-irradiation side is used in the above embodiment, a reflective optical modulator having common light-incident side and light-irradiation side may be used.

Though a front-type projector that projects an image in a direction for observing a screen is taken as an example in the above embodiment, the present invention may be applied to a rear-type projector that projects an image in a direction opposite to the direction for observing the screen.

Though the light source device of the present invention is installed in a projector in the above embodiment, the light source device may be installed on other optical equipments.

What is claimed is:

1. A light source device, comprising:
    a lamp body having a light source lamp and a reflector that holds the light source lamp, and having a reflection surface that reflects the light beam irradiated by the light source lamp;
    a lamp housing on which the lamp body is attached, the lamp housing having a first section disposed on the light-irradiation side of the lamp body and a second section extending from the first section and opposing at least a part of the side of the lamp body; and
    a plurality of projections protruding along an optical axis of the light beam irradiated by the light source lamp formed on the lamp housing,
    the reflection surface of the reflector having a cross section of an approximately concave section and positioning surfaces that are abutted to the plurality of projections of the lamp housing to align the reflector with the lamp housing in the optical axis direction, the positioning surfaces being provided on a distal side of the concave section on an outer periphery of an opening of the reflector, the positioning surfaces being flat and not protruding from the other distal side and shaped in a rectangular form,
    the plurality of projections being located to correspond to corners of the positioning surfaces, planar shape of the plurality of projections being approximately identical to planar shape of the corners of the positioning surfaces.

2. The light source device according to claim 1,
    the positioning surfaces being continuously flush.

3. The light source device according to claim 2,
    the plurality of projections being symmetrically arranged relative to the optical axis of the light beam irradiated by the light source lamp.

4. The light source device according to claim 2,
    the positioning surfaces having a rectangular profile, and
    the plurality of projections being formed on the lamp housing corresponding to the corners of the positioning surfaces.

5. The light source device according to claim 3,
    the positioning surfaces having a rectangular profile, and
    the plurality of projections being formed on the lamp housing corresponding to the corners of the positioning surfaces.

6. The light source device according to claim 2, further comprising:
    a light-transmissive component on the distal side of the concave section of the reflector, the light-transmissive component transmitting the light beam irradiated by the light source lamp, and
    the light-transmissive component having the positioning surfaces.

7. The light source device according to claim 3, further comprising:
    a light-transmissive component on the distal side of the concave section of the reflector, the light-transmissive component transmitting the light beam irradiated by the light source lamp, and
    the light-transmissive component having the positioning surfaces.

8. A projector, comprising:
    the light source device according to claim 1;
    an optical modulator that modulates a light beam irradiated by the light source device in accordance with image information; and
    a projection optical device that enlarges and projects the modulated light.

9. The projector according to claim 8,
    the positioning surfaces being continuously flush.

10. The projector according to claim 9,
    the plurality of projections being symmetrically arranged relative to the optical axis of the light beam irradiated by the light source lamp.

11. The projector according to claim 9,
    the positioning surfaces having a rectangular profile, and
    the plurality of projections being formed on the lamp housing corresponding to the corners of the positioning surfaces.

12. The projector according to claim 10,
    the positioning surfaces having a rectangular profile, and
    the plurality of projections being formed on the lamp housing corresponding to the corners of the positioning surfaces.

13. The projector according to claim 9, further comprising:
    a light-transmissive component on the distal side of the concave section of the reflector, the light-transmissive component transmitting the light beam irradiated by the light source lamp, and
    the light-transmissive component having the positioning surfaces.

14. The projector according to claim 10, further comprising:
    a light-transmissive component on the distal side of the concave section of the reflector, the light-transmissive component transmitting the light beam irradiated by the light source lamp, and
    the light-transmissive component having the positioning surfaces.

* * * * *